United States Patent
Koike

(10) Patent No.: US 7,003,052 B2
(45) Date of Patent: Feb. 21, 2006

(54) DIGITAL BROADCASTING RECEIVING APPARATUS AND CONTROL METHOD THEREOF

(75) Inventor: Masakazu Koike, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 883 days.

(21) Appl. No.: 09/814,960

(22) Filed: Mar. 23, 2001

(65) Prior Publication Data

US 2002/0039390 A1    Apr. 4, 2002

(30) Foreign Application Priority Data

Sep. 29, 2000    (JP) ............................. 2000-301067

(51) Int. Cl.
*H03K 9/00*    (2006.01)
*H04N 5/91*    (2006.01)
*H04N 7/025*    (2006.01)

(52) U.S. Cl. .......................... 375/316; 386/83; 725/32; 725/33

(58) Field of Classification Search ................ 375/316, 375/272, 240; 725/25, 32, 33; 386/142, 386/40; 360/5, 6; 348/553, 714
See application file for complete search history.

(56) References Cited

U.S. PATENT DOCUMENTS

| | | | | |
|---|---|---|---|---|
| 5,584,051 A | * | 12/1996 | Goken | 455/68 |
| 5,995,553 A | * | 11/1999 | Crandall et al. | 375/272 |
| 6,166,778 A | * | 12/2000 | Yamamoto et al. | 348/569 |
| 6,373,904 B1 | * | 4/2002 | Sakamoto et al. | 375/316 |
| 6,516,465 B1 | * | 2/2003 | Paskins | 725/25 |
| 6,658,232 B1 | * | 12/2003 | Johnson | 455/3.06 |
| 6,697,631 B1 | * | 2/2004 | Okamoto | 455/457 |

FOREIGN PATENT DOCUMENTS

| | | |
|---|---|---|
| JP | 62-249580 | 10/1987 |
| JP | 10098688 | 4/1998 |
| JP | 10-191273 | 7/1998 |
| JP | 11-41536 | 2/1999 |
| JP | 2000-23060 | 1/2000 |
| JP | 2000-132563 | 5/2000 |

* cited by examiner

*Primary Examiner*—Stephen Chin
*Assistant Examiner*—Cicely Ware
(74) *Attorney, Agent, or Firm*—Pillsbury Winthrop Shaw Pittman, LLP

(57) ABSTRACT

The present invention relates to a digital broadcasting receiving apparatus for generating a display signal from a received digital broadcasting signal. The apparatus comprises a detection section, a storage section, and a recording section. The detection section detects occurrence of an interrupt event overlapped with the digital broadcasting signal when displayed. The storage section starts storing digital broadcasting signals based on a detection result of this detection section. The recording section records information corresponding to a reproduction start position of the digital broadcasting signal stored by this storage section.

8 Claims, 16 Drawing Sheets

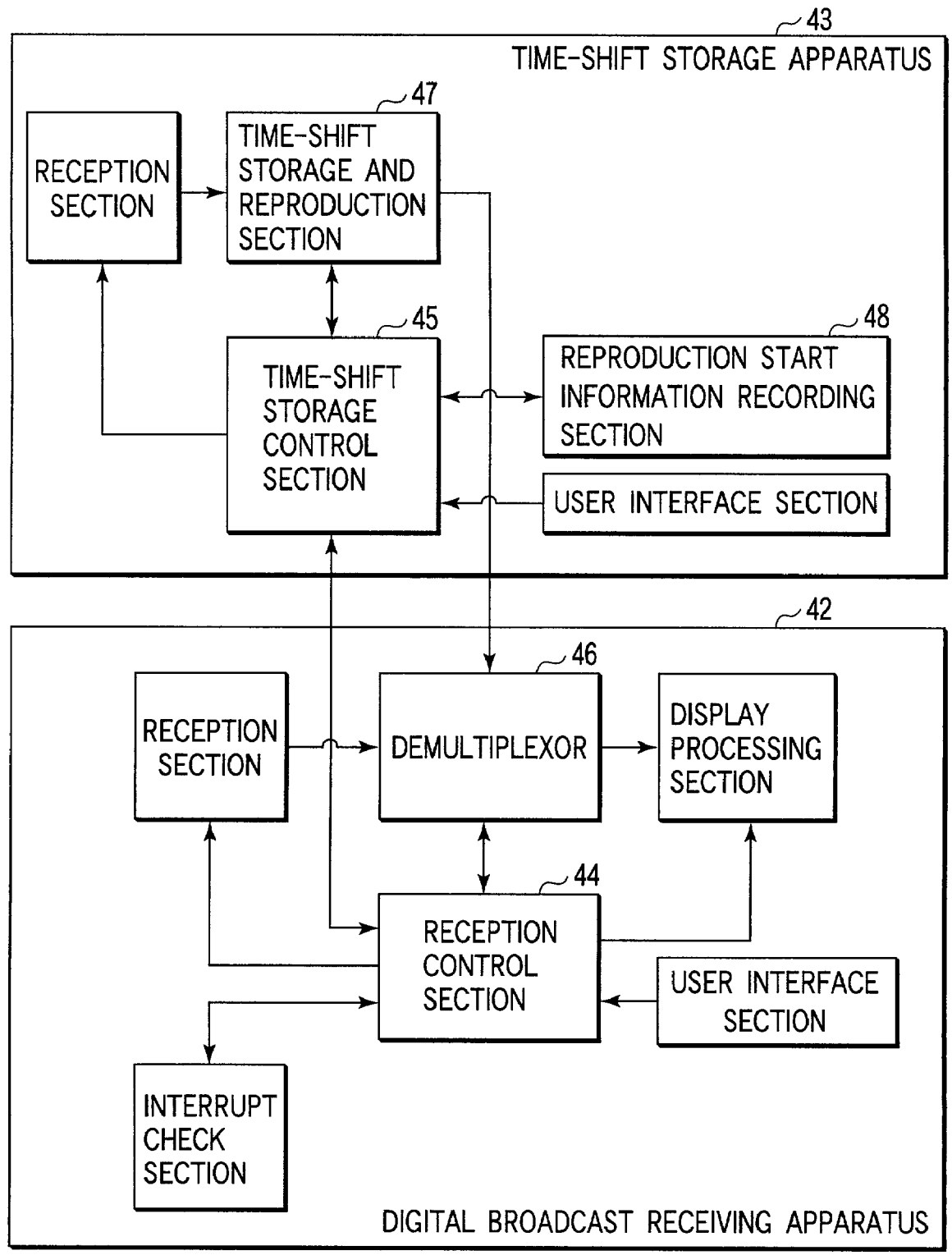
F I G. 15

DIGITAL BROADCASTING RECEIVING APPARATUS AND CONTROL METHOD THEREOF

CROSS-REFERENCE TO RELATED APPLICATIONS

This application is based upon and claims the benefit of priority from the prior Japanese Patent Application No. 2000-301067, filed Sep. 29, 2000, the entire contents of which are incorporated herein by reference.

BACKGROUND OF THE INVENTION

The present invention relates to a digital broadcasting receiving apparatus and a control method thereof for receiving, say, digital television broadcasts. More particularly, the present invention relates to a digital broadcasting reception technology using a time-shift feature of a data storage apparatus.

First, the following describes a reception signal supplied to the digital broadcasting receiving apparatus. In the following description, broadcasting information signifies information acquired by combining a plurality of information sources for providing digital broadcasting services.

Content information is a generic term for indicating contents of video information, voice information, and other programs. For example, the content information constituting contents of an ordinary television broadcasting service comprises video information and voice information. The content information constituting contents of an ordinary radio broadcasting service comprises just voice information.

Information for controlling reception operations of the digital broadcasting receiving apparatus is referred to as reception control information. The broadcasting information includes one or more content information and reception control information entities.

A transmission signal is a radio wave or a wired signal converted and modulated so that broadcasting information can be transmitted via a specified transmission path. In broadcasting signals, the transmission signal is transmitted via the transmission path and is then converted to an electric signal. This electric signal is used as a reception signal.

Presently, many commercialized digital broadcasting systems use broadcasting information by multiplexing various types of information in a stream format. This stream format is known as the MPEG (Moving Picture Image Coding Experts Group) 2 transport stream (hereafter referred to as MPEG2-TS) specified by ISO (International Organization for Standardization)/IEC (International Electrotechnical Commission)-13818-1.

As specified in ARIB (Association of Radio Industries and Businesses)-STD-B10, ARIB-STD-B24, ARIB-STD-B25, and the like published from Association of Radio Industries and Businesses, for example, there are extended formats of information multiplexed in compliance with MPEG2-TS.

The following describes an example which uses the MPEG2-TS as broadcasting information. As the content information, the broadcasting information contains one or more of content information types such as for video services, voice services, and other data broadcasting services. The PSI (Program Specific Information) is contained as the reception control information.

As described in ARIB-STD-B10, the PSI information contains PMT (Program Map Table) information and PAT (Program Association Table) information and the like. The PMT information indicates how the video information, voice information, or data information is transmitted in a received stream. The PAT information provides how the PMT is multiplexed.

There are provided various extended formats for signals multiplexed with MPEG2-TS. For example, as described in ARIB-STD-B10, it is possible to include SI (Service Information). Further, as described in ARIB-STD-B25, it is possible to include ECM (Entitlement Control Message) for controlling reception of the conditional access broadcasting and mail information such as announcement from a broadcasting station.

As described in ARIB-STD-B24, the same broadcasting information can be used to transmit the content information for sending and receiving data broadcasts (hereafter referred to as the data broadcasting content information). The data broadcasting content information can be used to reference the content information in video and voice information, making it possible to provide the data broadcasting content in the form of multimedia services including these video and voice services.

The digital broadcasting receiving apparatus receives a transmitted reception signal and generates a display signal for providing an indication corresponding to the content. The display signal is processed in a display apparatus and is supplied to users as video or voice data.

With respect to data broadcasting, it is possible to provide a program by combining video, voice, and data. For example, in the middle of a video or voice program, a news flash can be broadcast with multiplexing in the form of data broadcasting information and superimposed on video or voice. It is also possible to display news in a blank area prepared by reducing a video image area.

The data broadcasting may provide a data broadcasting service by concurrently displaying an ordinary television broadcasting service.

When the main program content is provided along with video and voice, additional information in the data broadcasting may not only be useful, but also unnecessary or nonurgent depending on users or cases. When such additional information is unnecessary or nonurgent, losing part of the image or reducing the screen for unnecessary information is merely degradation of the content quality to the users.

The above-mentioned conditional access broadcasting provides a PPV (Pay Per View) program which requires charging for individual programs. Basically, such a program is available only when the user subscribes to it. Before a possible subscription, a preview period is provided for the user to determine the subscription. During this preview period, descrambling can be activated. The display of the content information is accompanied by an indication notifying the preview in progress for promoting the subscription.

When the preview period expires without subscription to the program, the content information cannot be descrambled, preventing the program from being enjoyed. However, even after expiration of the preview period, it is possible to subscribe to that program under a specified condition. Subscribing to the program enables to audiovisually view the content.

As mentioned above, since an indication showing that the preview is in progress is displayed during the preview period, a part of the screen is obstructed, which can annoy the user. After expiration of the preview period, a blackout occurs until the subscription is completed. Thus, even if a user subscribes to the program, he or she cannot audiovisually view the content during a period between the blackout and the completion of the subscription. Either case results in worsening the quality of program service for users.

As mentioned above, when an interrupt factor occurs in the active program, the conventional digital broadcasting receiving apparatus displays associated information concurrently with the broadcast content. To users, this may be a loss of the quality in the original content.

For example, a PPV program is unviewable until a specified process is executed for subscription. Even if a viewing restriction condition is cleared to make the program viewable, the conventional digital broadcasting receiving apparatus makes it impossible to view the content already broadcast before the subscription.

Theoretically, a user can view the content by explicitly starting recording in a storage apparatus before the program becomes unviewable according to the viewing restriction. However, whether the content is stored appropriately largely depends on how the user utilizes the apparatus. Further, the user is necessitated to do complicated operations.

BRIEF SUMMARY OF THE INVENTION

The present invention has been made in consideration of the foregoing. It is therefore an object of the present invention to provide a digital broadcasting receiving apparatus and a control method thereof for promptly displaying information about interrupt factors to users without degrading the display quality of contents or a partial loss of the displayed content.

The digital broadcasting receiving apparatus according to the present invention aims at generating a display signal from a received digital broadcasting signal. This apparatus comprises a detection section, a storage section, and a recording section. The detection section detects occurrence of an interrupt event which is overlapped with the digital broadcasting signal for display. Based on a detection result of the detection section, the storage section starts storing the digital broadcasting signal. The recording section records information corresponding to a position for reproducing the digital broadcasting signal stored by this storage section.

The digital broadcasting receiving apparatus's control method according to the present invention provides control to generate a display signal from the received digital broadcasting signal. This method comprises a detection step, a storage step, and a recording step. The detection step detects occurrence of an interrupt event which is overlapped with the digital broadcasting signal for display. Based on a detection result of the detection step, the storage step starts storing the digital broadcasting signal. The recording step records information corresponding to a position for reproducing the digital broadcasting signal stored by this storage step.

When the interrupt event terminates, the configuration and the method as mentioned above enable to read the stored digital broadcasting signal for display based on information corresponding to the recorded reproduction start position. This makes it possible to promptly display information about the interrupt factor to users. It is also possible to prevent the content's display quality from degrading and the displayed content from being partially lost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF DRAWINGS

The accompanying drawings, which are incorporated in and constitute a part

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 15 is a block diagram illustrating a seventh embodiment of the present invention.

DETAILED DESCRIPTION OF THE INVENTION

Figure 1:
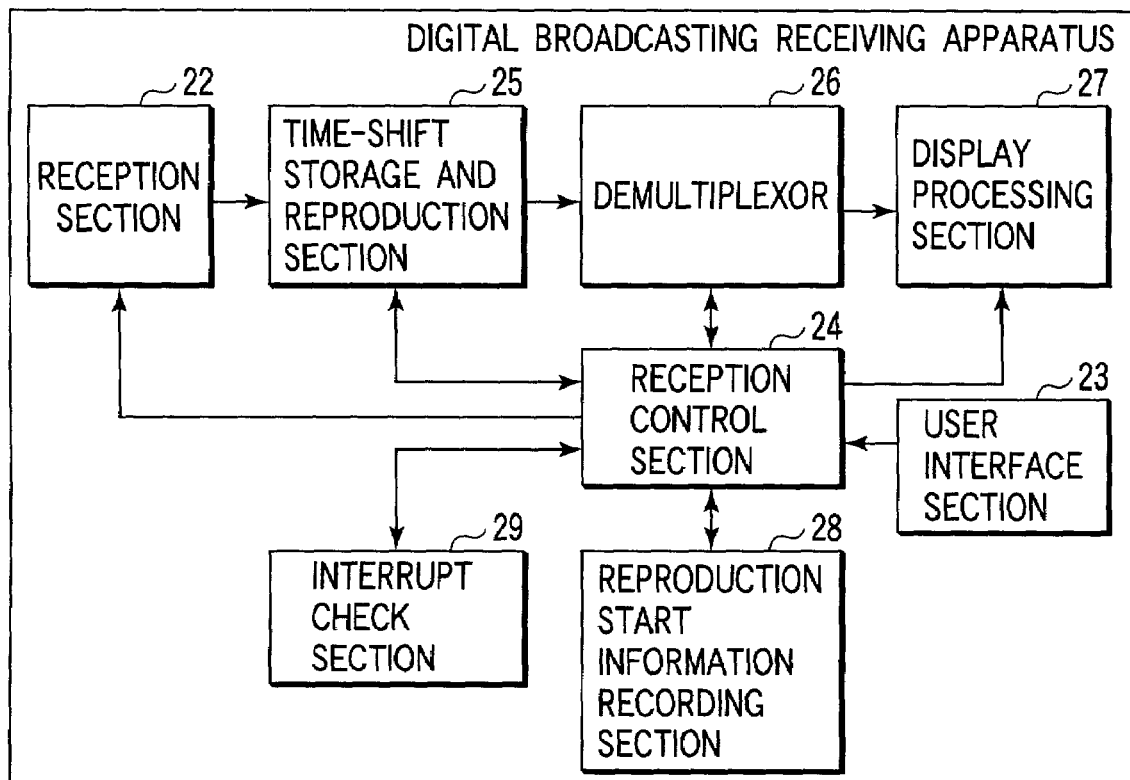
FIG. 1 is a block diagram illustrating a first embodiment of the present invention.

The first embodiment of the present invention will be described in further detail with reference to the accompanying drawings. In FIG. 1, a reception section 22 in a digital broadcasting receiving apparatus 21 receives user's information for selecting a program from a user interface section 23 and controls a reception operation according to the selected content.

Under control of a reception control section 24, the reception section 22 selectively applies demodulation, error correction, and the like to a received signal based on a method corresponding to a transmission signal, thus acquiring reception information in the MPEG2-TS format. This reception information is supplied to a time-shift storage and reproduction section 25.

This time-shift storage and reproduction section 25 stores the reception information as storage information in a built-in storage medium. Based on control of the reception control section 24, the time-shift storage and reproduction section 25 can reproduce the stored information for retrieving the past reception information as restored reproduction information. The time-shift storage and reproduction section 25 supplies a demultiplexor 26 with either this reproduction information or the reception information selectively.

The demultiplexor 26 separates and extracts the content information in the video or voice information from the supplied information and selectively supplies it to a display processing section 27. The display processing section 27 can generate a display signal to be displayed on a display section based on either or both of the content information from the demultiplexor 26 and OSD (On Screen display) information from the reception control section 24.

The reception control section 24 controls operations of each section so that the digital broadcasting receiving apparatus 21 can perform a sequence of reception operations. Further, the reception control section 24 requests the demultiplexor 26 to selectively receive the reception control information such as PSI and SI and evaluates a broadcasting state according to the received information.

The reception control section 24 requests the demultiplexor 26 to separate and extract data broadcasting content information which is the content information for reproducing and displaying data broadcasts. The reception control section 24 can acquire the separated data broadcasting content information, process it according to a method corresponding to the data broadcasting system, and generate OSD display information. Moreover, the reception control section 24 accepts a user operation via the user interface section 23 and processes it accordingly.

A time-shift operation is performed via the user interface section 23 according to a user's operation. When receiving an user's operation to interrupt the reproduction, the reception control section 24 records the storage medium location of the stored information being reproduced at the time of the interrupt in the reproduction start information recording section 28. When the user starts the reproduction, the reception control section 24 reproduces the reproduction information from the stored information corresponding to the record in the reproduction start information recording section 28.

The reception control section 24 supplies the interrupt check section 29 with information about the interrupt event for interrupt checking.

Figure 2:
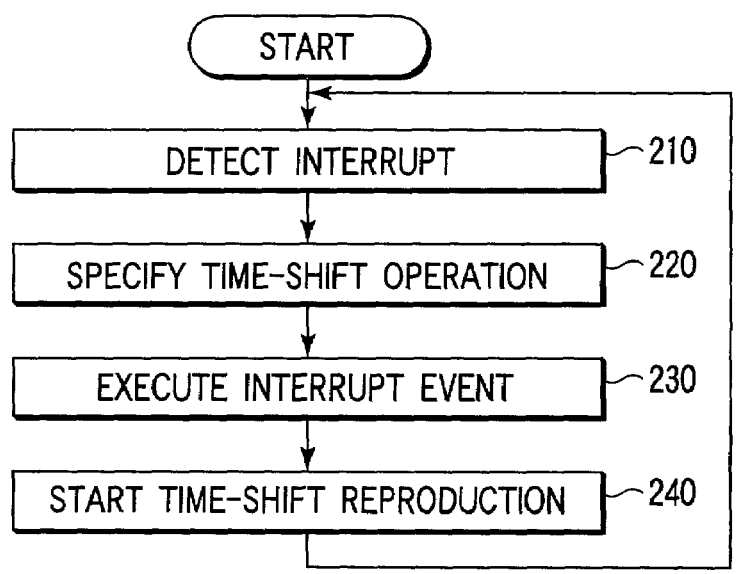
FIG. 2 is a flowchart showing an overall operation of the first embodiment of the present invention.
Figure 3A:
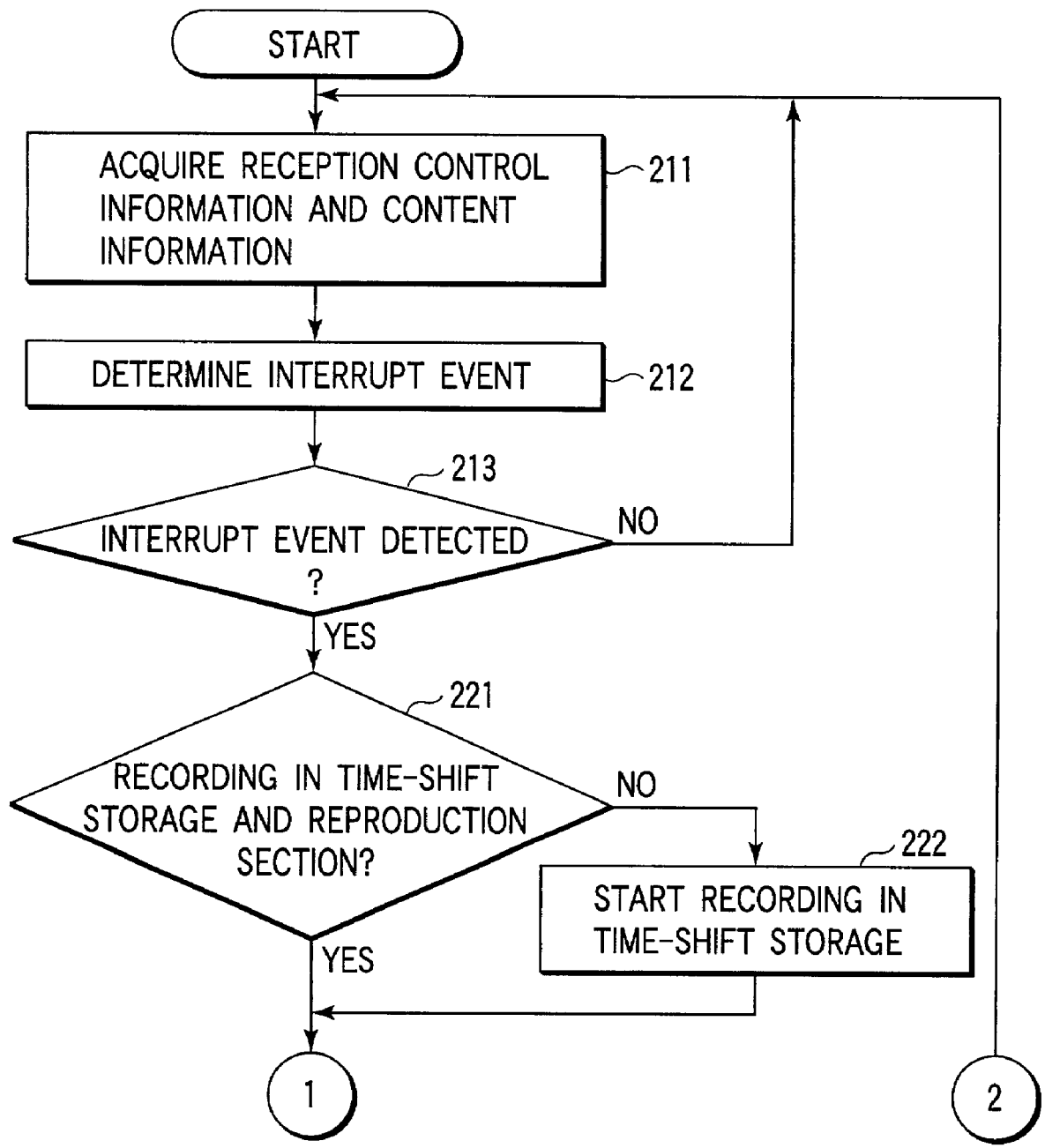
FIGS. 3A and 3B are flowcharts showing detailed operations for the first embodiment of the present invention.
Figure 3B:
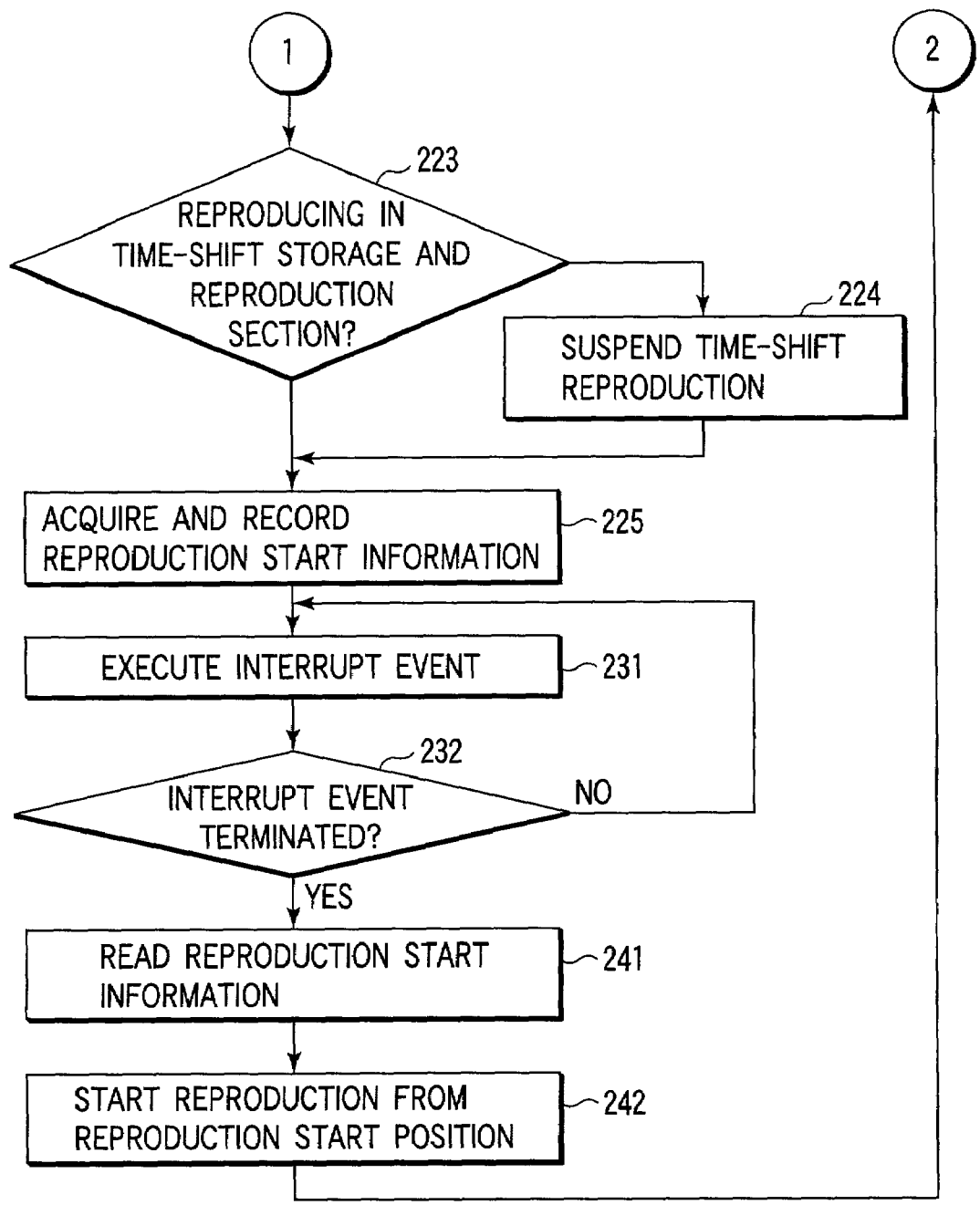
Figure 4:
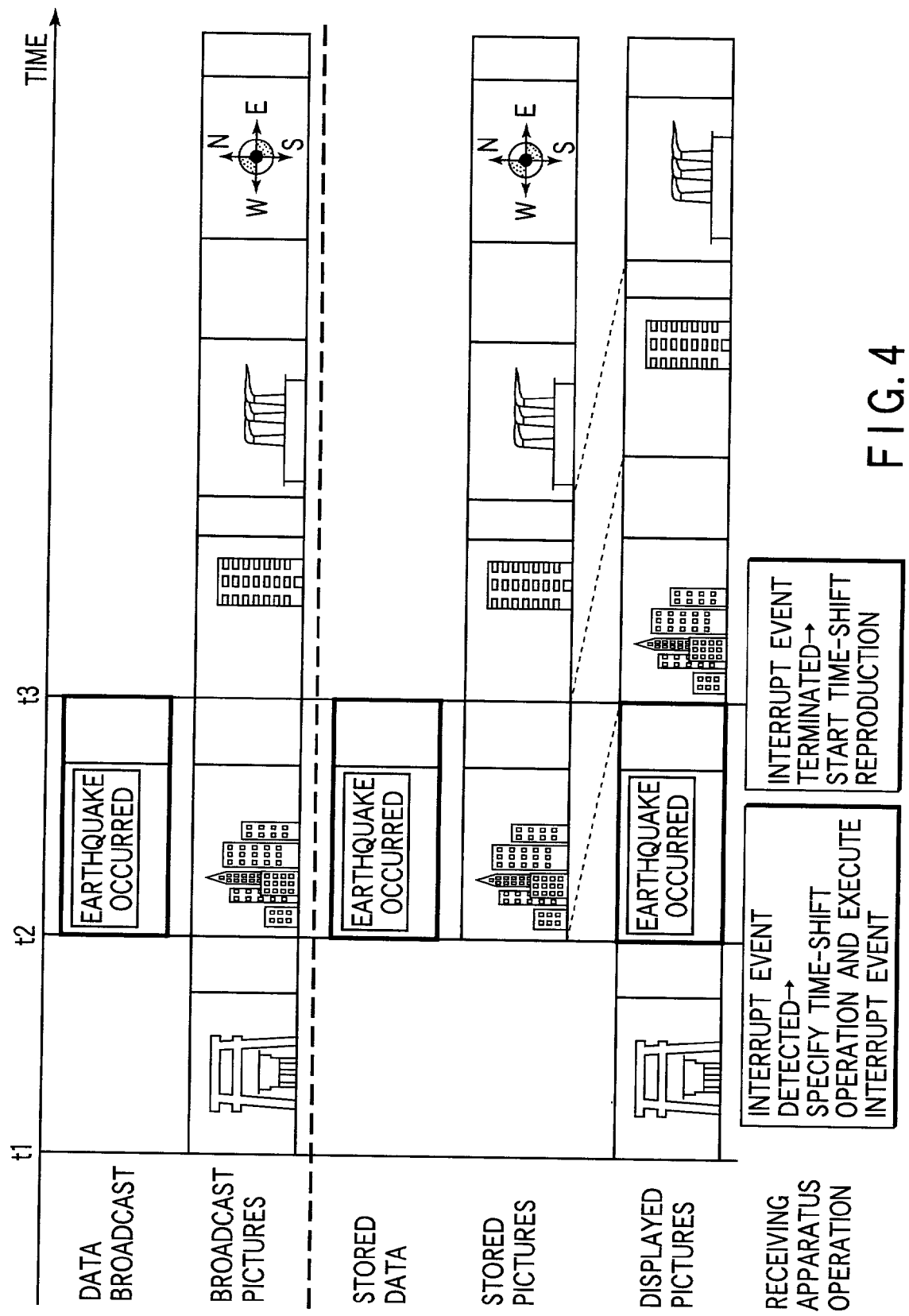
FIG. 4 illustrates detailed operations for the first embodiment of the present invention on displayed pictures.

FIGS. 2, 3A, and 3B show operations of the reception control section 24 for the first embodiment. FIG. 4 depicts relationship among a display picture generated by the display signal at this time, a broadcast picture indicated by the reception information, a stored picture in the stored information, and operations of the digital broadcasting receiving apparatus 21. An example in FIG. 4 shows a state in which no time-shift operation takes place, namely no stored information starts to be recorded. The following describes operations of the digital broadcasting receiving apparatus 21 in response to an interrupt event with reference to FIGS. 2, 3A, 3B, and 4.

[Detect Interrupt (210)]

It is assumed that a data broadcast content occurs as an interrupt event at time t2 in FIG. 4. while a content of video and voice information is displayed, the reception control section 24 receives the PMT which is one of reception control information entities and is separated and supplied by the demultiplexor 26. When detecting a change in the broadcast content configuration according to the PMT change, the reception control section 24 confirms the content to be displayed according to the PMT content.

When the content to be displayed is the data broadcast content to be provided by using data broadcasting content information, the reception control section 24 requests the demultiplexor 26 to separate and extract the data broadcasting content information.

The reception control section 24 receives the data broadcasting content information according to the request from the demultiplexor 26 (211). At this time, the reception control section 24 supplies that content to the interrupt check section 29 for confirmation and determines if the received information is an interrupt event (212).

As a result of the confirmation, the received data broadcast content may be provided by using hitherto reproduced video and voice broadcasts. In this case, the reception control section 24 determines the data broadcast content to be an interrupt event for the video and voice content and detects it (213).

When a user operates the digital broadcasting receiving apparatus 21, this event is assumed to be an interrupt event and is detected likewise. In this case, the interrupt event allows the time-shift storage and reproduction section 25 to record the content information. In addition, the user temporarily uses another broadcasting service such as an associated data broadcast content or a function specific to the receiving apparatus 21. For example, the user displays a data broadcast program attached to the active program, or calls a setup menu for the receiving apparatus 21.

[Specify Time-Shift Operation (220)]

When the interrupt event is detected, the time-shift storage and reproduction section 25 may not start recording the stored information during acquisition of the recording position (221). In this case, control is passed to start recording (222). When the time-shift storage and reproduction section 25 is reproducing data (223), control is passed to suspend the reproduction (224).

The reception control section 24 acquires information about the reproduction start position of the stored information for the next reproduction in the storage medium. If the reproduction already starts and the time-shift storage and reproduction section 25 suspends the reproduction, the reproduction start position in the medium should correspond to the stored information position when the reproduction is suspended. If the reproduction does not start, the reproduction start position should correspond to the position where the storage started. The reception control section 24 records the information about the acquired reproduction start position as reproduction start information in the reproduction start information recording section 28 (225).

[Execute Interrupt Event (230)]

The reception control section 24 displays the data broadcast content as the interrupt event by generating OSD display information from the data broadcasting content information and supplying it to the display processing section 27 (231). When the user finishes viewing the data broadcast content and performs a termination operation on the user interface section 23, the reception control section 24 detects this operation (232). Similarly, termination of the interrupt event is assumed when the pertinent data broadcasting content information or equivalent reception control information is removed from the information supplied to the demultiplexor 26 (time t3 in FIG. 4).

[Start Time-Shift Reproduction (240)]

When the interrupt event terminates, the reception control section 24 reads the reproduction start information from the reproduction start information recording section 28 (241). According to the recording position information in the reproduction start information, the reception control section 24 provides control so that the time-shift storage and reproduction section 25 can starts reproduction.

According to the reception control section 24, the time-shift storage and reproduction section 25 generates reproduction information from the stored information indicated by the specified recording position and supplies the generated information to the demultiplexor 26. Concurrently, the reception control section 24 separates the content information from the reproduction information and controls the demultiplexor 26 and the display processing section 27 in order to generate a display signal from this content information. Thus, the time-shift reproduction starts from the reproduction start position (242).

The reception control section 24 records information for specifying an audiovisually viewed data broadcast content so that the same data broadcast content is not processed even after this content is received.

Even when an interrupt event occurs and affects the main content, the above-mentioned first embodiment can display the interrupt event to users without impairing the content display quality despite occurrence of that interrupt event.

The first embodiment uses the MPEG2-TS format as an example of the multiplexed content format, and the present invention is not limited thereto. For example, time division signals or TCP/IP (Transmission Control Protocol/Internet Protocol) packets are also available for multiplexing. In these cases, it is also possible to implement the digital broadcasting receiving apparatus 21 which can provide similar effects by performing appropriate processing in each section.

Further, the first embodiment records reproduction information from the demultiplexor 26 to the time-shift storage and reproduction section 25. The present invention is not limited thereto. For example, there are possibilities of selectively recording each content information and PMT information, selectively recording only necessary information from the content information, and reversibly compressing the information for recording.

The following are contemplated as falling within the scope of the present invention. Information is supplied to the time-shift storage and reproduction section 25 so that sufficient reproduction information can be generated for restoring the user-requested broadcast content after the reproduction restarts. The time-shift storage and reproduction section 25 stores the supplied information as stored information and reproduces the reproduction information from the stored information.

As an example, the first embodiment explains the data broadcast content which uses the video and voice content as an interrupt event. Further, it is also possible to multiplex data independent of the video and voice content and assume detection of this data to be occurrence of an interrupt event. When mail is received via a broadcasting system or a communication line, this can be also interpreted as an interrupt event for performing similar operations.

Moreover, the first embodiment explains an example of determining an interrupt event. There can be various methods of determining whether the content information contained in the reception information is an interrupt event and systems for installing information to perform the determination. For example, it is possible to install information for identifying an interrupt event in the data broadcasting content information. When a data broadcast content is received, this installed information is used to determine the presence of an interrupt event.

Yet further, the first embodiment provides just a connection example. For example, it is also possible to directly supply reception information from the reception section 22 to the demultiplexor 26. In this case, the demultiplexor 26 may multiplex and separate selectively either or both of reproduction information from the time-shift storage and reproduction section 25 and reception information from the reception section 22.

When the information is selectively multiplexed and separated, the reproduction information is separated under control of the reception control section 24 when the time-shift reproduction starts. When both the information is multiplexed and separated, the multiplexed and separated content information is selected. At this time, content information and reception control information for reproduction information are acquired from the reproduction information side. Data broadcasting content information and reception control information are acquired from the reception information side. When an interrupt event occurs, it can be promptly determined by using information from the reception information.

Figure 5:
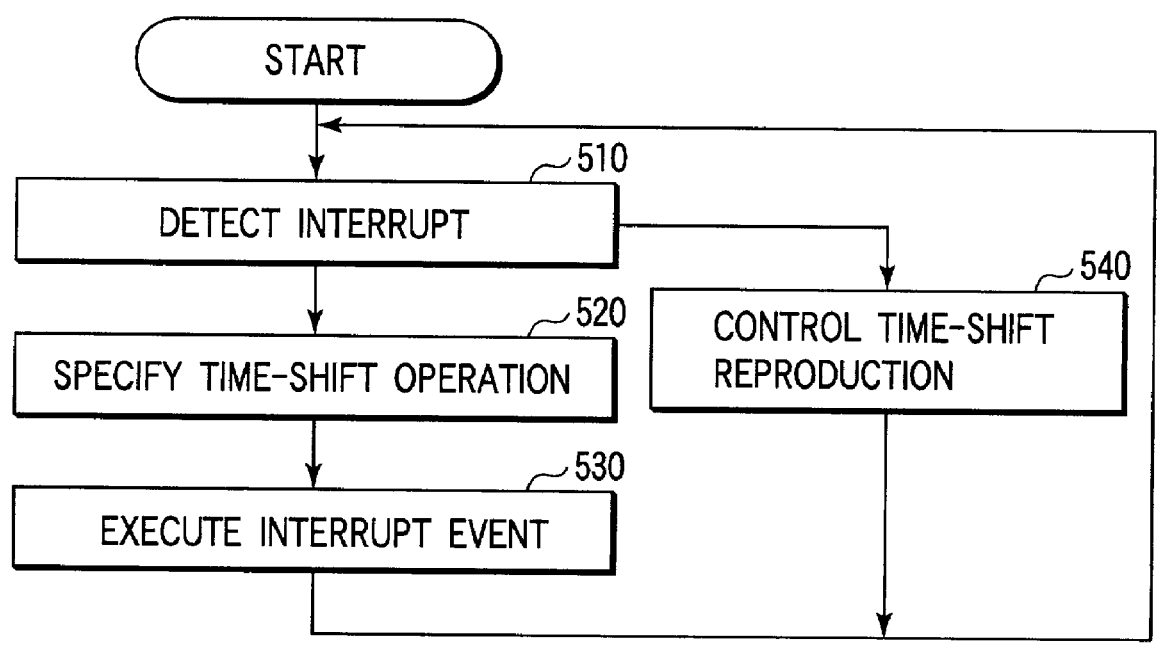
FIG. 5 is a flowchart illustrating an overall operation of a second embodiment of the present invention.
Figure 6A:
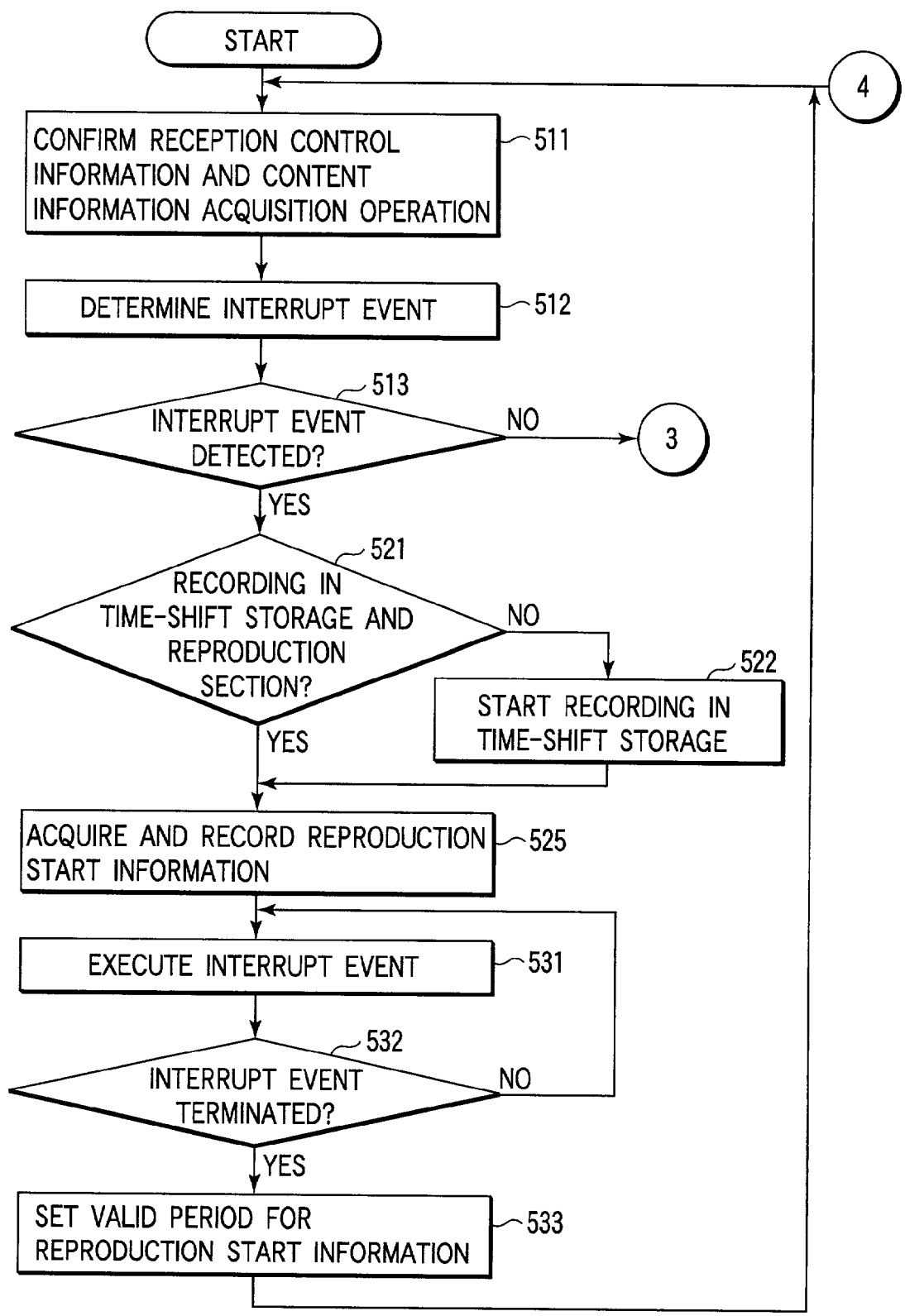
FIGS. 6A and 6B are flowcharts showing detailed operations for the second embodiment of the present invention.
Figure 6B:
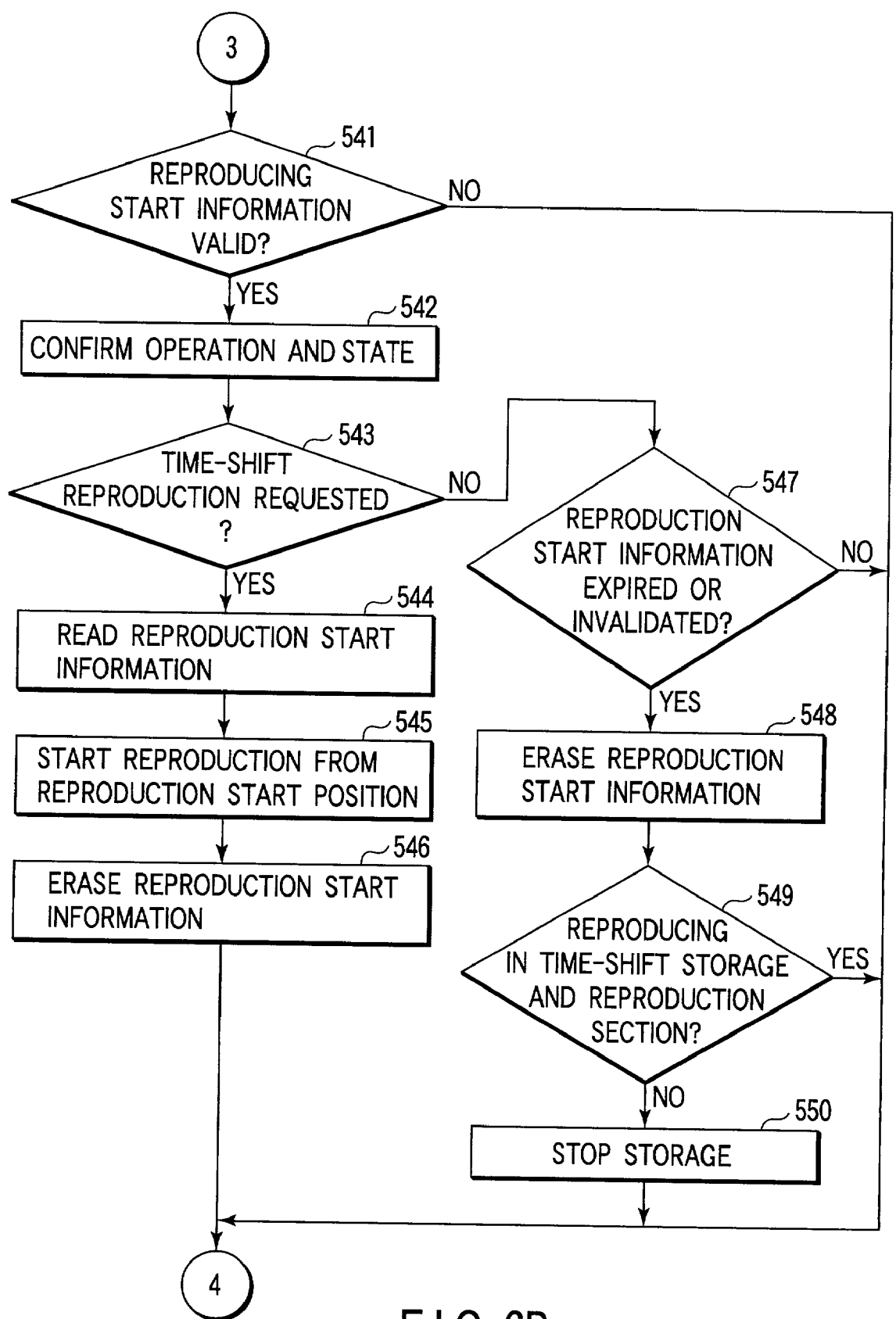
Figure 7:
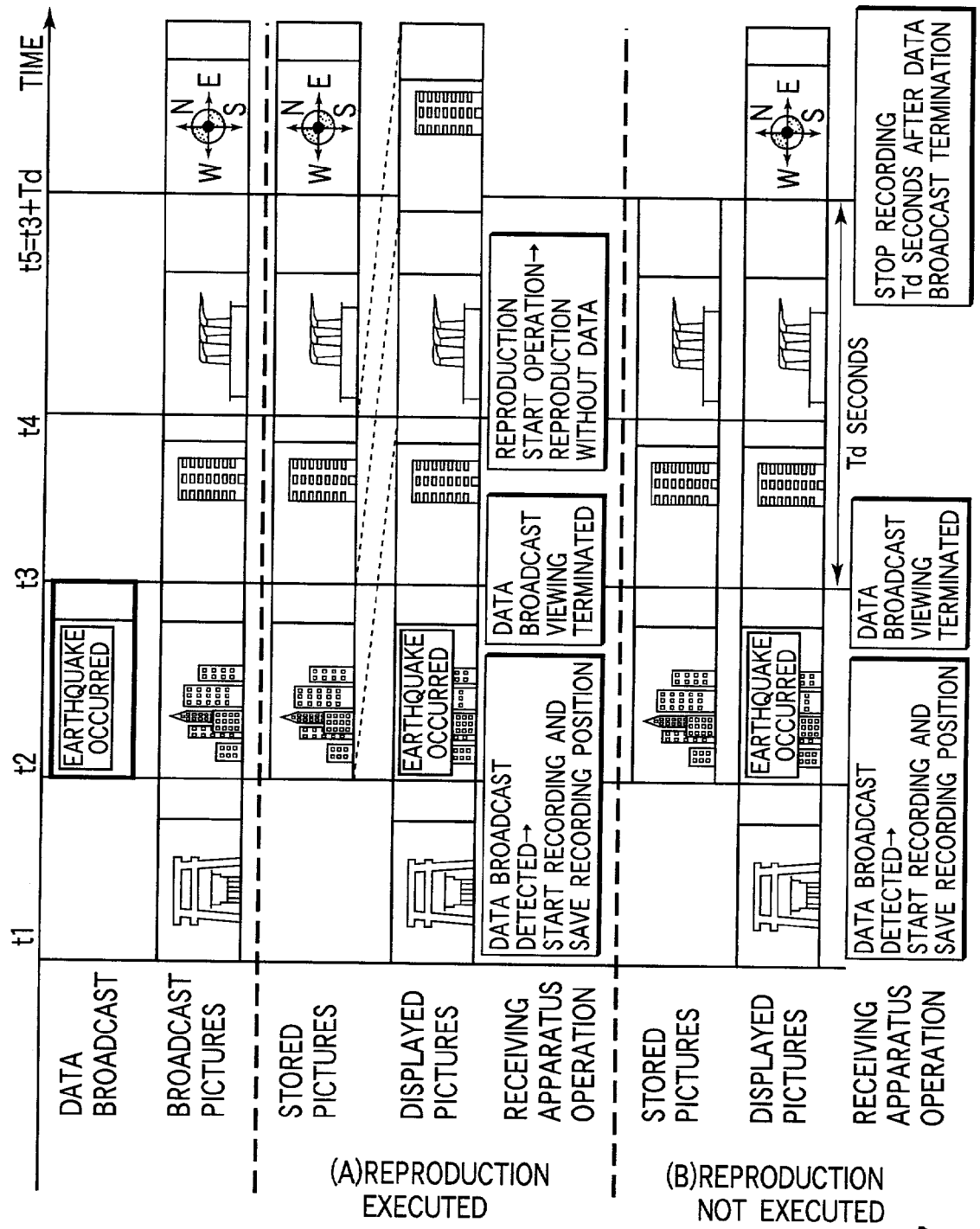
FIG. 7 illustrates detailed operations for the second embodiment of the present invention on displayed pictures.

FIGS. 5, 6A, and 6B show operations of the reception control section 24 for the second embodiment. FIG. 7 depicts relationship among a display picture generated by the display signal at this time, a broadcast picture indicated by the reception information, a stored picture in the stored information, and operations of the digital broadcasting receiving apparatus 21. An example in FIG. 7 shows a state in which no time-shift operation takes place, namely no stored information starts to be recorded. The following describes operations of the digital broadcasting receiving apparatus 21 in response to an interrupt event with reference to FIGS. 5, 6A, 6B, and 7.

[Detect Interrupt (510)]

No interrupt event is detected at time t1 in FIG. 7. It is assumed that the data broadcast content occurs as an interrupt event at t2. While a content of video and voice information is displayed, the reception control section 24 receives the PMT which is one of reception control information entities and is separated and supplied by the demultiplexor 26. When detecting a change in the broadcast content configuration according to the PMT change, the reception control section 24 confirms the content to be displayed according to the PMT content.

When the content to be displayed is the data broadcast content to be provided by using data broadcasting content information, the reception control section 24 requests the demultiplexor 26 to separate and extract the data broadcasting content information.

The reception control section 24 receives the data broadcasting content information according to the request from the demultiplexor 26 (511). At this time, the reception control section 24 supplies that content to the interrupt check section 29 for confirmation and determines if the received information is an interrupt event (512).

As a result of the confirmation, the received data broadcast content may be provided by using hitherto reproduced video and voice broadcasts. In this case, the reception control section 24 determines the data broadcast content to be an interrupt event for the video and voice content and detects it (513).

When a user operates the digital broadcasting receiving apparatus 21, this event is assumed to be an interrupt event and is detected likewise. In this case, the interrupt event allows the time-shift storage and reproduction section 25 to record the content information. In addition, the user temporarily uses another broadcasting service such as an associated data broadcast content or a function specific to the receiving apparatus 21. For example, the user displays a data broadcast program attached to the viewed program, or calls a setup menu for the receiving apparatus 21.

[Specify Time-Shift Operation (520)]

When the interrupt event is detected, the time-shift storage and reproduction section 25 may not start recording the stored information during acquisition of the recording position (521). In this case, control is passed to start recording (522).

From the time-shift storage and reproduction section 25, the reception control section 24 acquires information about the reproduction start position of the stored information for the next reproduction in the storage medium. If the reproduction already starts, the reproduction start position in the medium should correspond to the position to reproduce the stored information when reproduction start position information is acquired. If recording the stored information does not start, the reproduction start position should correspond to the position where the storage started.

An example in FIG. 7 shows the case where no storage starts. In this case, the reproduction start position should be a recording position corresponding to the stored information at the time t2. The acquired reproduction start position information is stored as the reproduction start information in the reproduction start information recording section 28 (525).

The reproduction start information can save one or a specified number of reproduction position information entities. When it is possible to record one reproduction position information entity, it is not overwritten if already recorded. When it is possible to record a plurality of reproduction position information entities, additional reproduction position information is recorded in an area where no information is recorded.

[Execute Interrupt Event (530)]

An interrupt event is executed. The interrupt event may occur due to an interrupt by the data broadcast content. In this case, the reception control section 24 displays the data broadcast content as the interrupt event by generating OSD display information from the data broadcasting content information and supplying it to the display processing section 27 (531).

The PMT is modified when the broadcast is modified and the corresponding data broadcasting terminates. When the reception control section 24 detects a change in the PMT, the interrupt check section 29 makes a determination. As a result of the determination, it may be found that the broadcast does not contain a content according to the hitherto used data broadcast content. In this case, termination of the interrupt event is determined (532).

When detecting the interrupt event termination, the reception control section 24 terminates the interrupt event display. Based on the PMT specification, the reception control section 24 controls the display processing section 27 to display the content information. Further, based on the interrupt event start and end times, the reception control section 24 computes and sets a valid period for the reproduction start information (533). In this example, the valid period is assumed to be td seconds after the interrupt event end time. When the interrupt event terminates, control returns to the interrupt detection.

When a user operation causes the interrupt event, the reception control section 24 performs the corresponding interrupt processing such as menu operations, data broadcast selection, and the like. When a user operation terminates the interrupt event according to the interrupt event processing, termination of the interrupt event is determined as mentioned above. Likewise, the reception control section 24 controls the interrupt display termination and the content display based ton the PMT.

[Control Time-Shift Reproduction (540)]

When no interrupt event is detected during the interrupt event determination (513), the reception control section 24 confirms whether the user requested the time, provided that the reproduction start information is valid (543). A user operation requests the time-shift reproduction via the user interface section 23.

When the time-shift reproduction is requested, the reception control section 24 reads reproduction start information from the reproduction start information recording section 28 (544). The reception control section 24 controls so that the time-shift storage and reproduction section 25 starts reproduction in accordance with the information about the recording position in the reproduction start information. According to the reception control section 24, the time-shift storage and reproduction section 25 generates reproduction information from the stored information indicated by the specified recording position and supplies the generated information to the demultiplexor 26.

Concurrently, the reception control section 24 separates the content information from the reproduction information, and then controls the demultiplexor 26 and display processing section 27 to generate a display signal from this content information. The time-shift reproduction then starts from the reproduction start position (545).

The reception control section 24 records information in itself for specifying an audiovisually viewed data broadcast content so that the same data broadcast content is not processed even after this content is received.

When no time-shift reproduction is requested, the reception control section 24 confirms whether the reproduction start information is valid (547). The reproduction start information is assumed to be invalidated after expiration of the valid period for the this information. When a user operation breaks continuity of the stored information, the reproduction start information is also assumed to be invalid.

When a user selects another program, information about the hitherto viewed program is interrupted. The hitherto stored reproduction start information is assumed to be invalidated. Also when the stored information corresponding to the reproduction start information is deleted, the reproduction start information is assumed to be invalid.

When the reproduction start information is invalidated, this information is deleted (548). When the time-shift storage and reproduction section 25 is not reproducing, no reproduction start information may be recorded (549). In this case, the reception control section 24 stops storage in the time-shift storage and reproduction section 25 (550).

Even if an interrupt event occurs to affect the main content, the above-mentioned second embodiment can provide a service without degrading the content display quality in response to the user's request.

Figure 8:
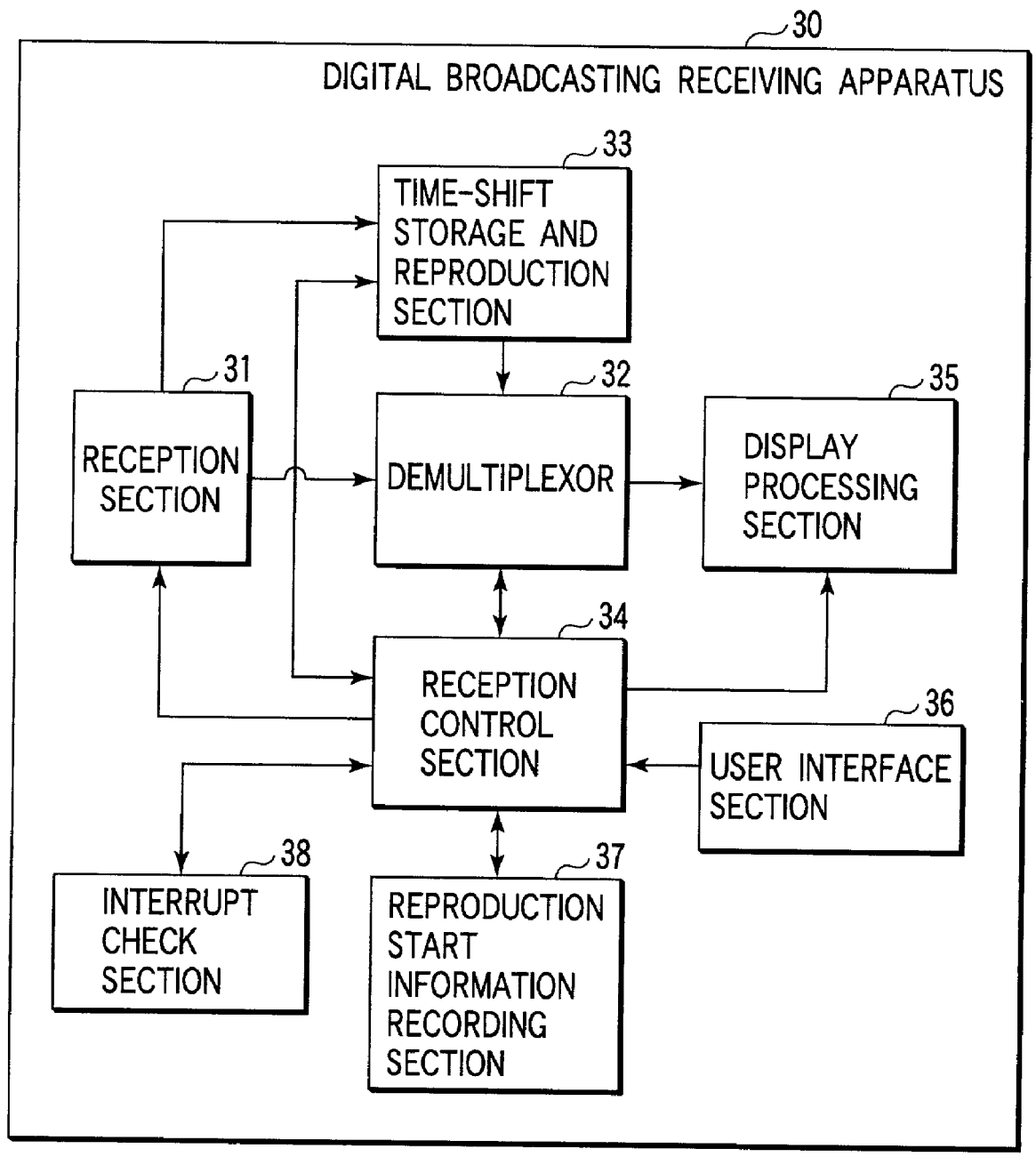
FIG. 8 is a block diagram illustrating a third embodiment of the present invention.

FIG. 8 shows the third embodiment of the present invention. Unlike the first and second embodiments, the third embodiment supplies reception information from the reception section 31 in the digital broadcasting receiving apparatus 30 to the demultiplexor 32. Especially, information associated with the interrupt event is extracted from the reception information.

In FIG. 8, the reception section 31 in the digital broadcasting receiving apparatus 30 selectively applies demodulation and error correction to a given carrier signal from the reception signal according to the method compliant to the transmission system and obtains reception information in the MPEG2-TS format. This reception information is supplied to the time-shift storage and reproduction section 33.

The time-shift storage and reproduction section 33 records the reception information as stored information. Under control of the reception control section 34, the time-shift storage and reproduction section 33 can supply the past reception information as restored reproduction information. When no reproduction information occurs, the demultiplexor 32 separates and extracts the content information in the video and voice information from the supplied reception information and selectively supplies the extracted content information to the display processing section 35. When the reproduction information occurs, the demultiplexor 32 separates and extracts the content information in the video and voice information from the reproduction information and selectively supplies the extracted content information to the display processing section 35.

The reception control information associated with the content information reproduction is separated from either the reception information or the reproduction information supplied to the display processing section 35.

The demultiplexor 32 extracts the reception control information and the content information for determining an interrupt event from the reception information and supplies the extracted information to the reception control section 34. The display processing section 35 generates a display signal displayed on a possibly connected display section according to either or both of the content information from the demultiplexor 32 and the OSD display information from the reception control section 34.

The reception control section 34 controls respective section operations so that the digital broadcasting receiving apparatus 30 can perform a sequence of reception operations. Further, the reception control section 34 can request the demultiplexor 32 to separate and extract the data broadcasting content information for reproducing and displaying data broadcasts. The reception control section 34 can acquire the separated data broadcasting content information, process it according to a method compliant to the data broadcasting system, and generate OSD display information. In addition, the reception control section 34 accepts a user operation via the user interface section 36 and processes it accordingly.

A user operation allows the user interface section 36 to perform a time-shift operation. When accepting an operation for interrupting the reproduction from the user, the reception control section 34 uses the reproduction start information recording section 37 to record a storage location of the presently reproduced stored information on the storage medium. When the user starts the reproduction, the reception control section 34 reproduces the reproduction information from the stored information corresponding to the record in the reproduction start information recording section 37.

The reception control section 34 provides the interrupt check section 38 with information about the interrupt event for determining an interrupt.

Figure 9:
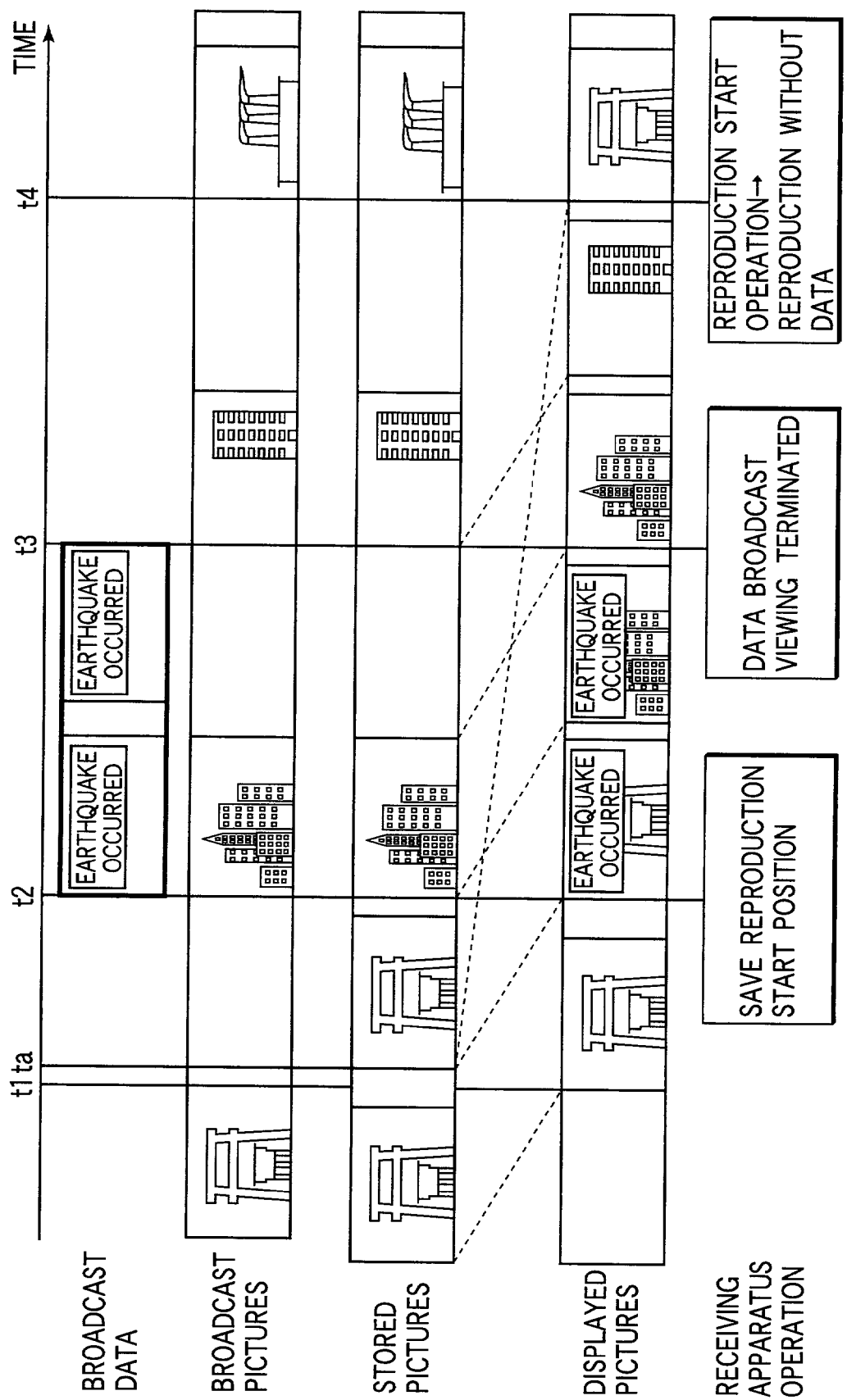
FIG. 9 illustrates detailed operations for the third embodiment of the present invention on displayed pictures.

With respect to the third embodiment, FIG. 9 illustrates relationship among a display picture generated by the display signal, a broadcast picture indicated by the reception information, a stored picture in the stored information, and operations of the digital broadcasting receiving apparatus 30. Operations for the third embodiment can be explained similarly to those explained with reference to FIGS. 5, 6A, and 6B.

Namely, when no time-shift reproduction takes place, operations for the third embodiment are same as those for the second embodiment as mentioned above. The following describes operations when the time-shift reproduction takes place. At this time, it is assumed that the stored information recording is already initiated.

[Detect Interrupt (510)]

While a content of video and voice information is displayed, a change may be made to the PMT as reception control information in the reception information. When detecting a change in the broadcast content configuration according to the PMT change, the reception control section 34 confirms the PMT change content and determines a content to be displayed. When the content to be displayed is the data broadcast content to be provided by using data broadcasting content information, the reception control section 34 requests the demultiplexor 32 to separate and extract the data broadcast content from the reception information.

The reception control section 34 receives the data broadcasting content information according to the request from the demultiplexor 32 (511). At this time, the reception control section 34 supplies that content to the interrupt check section 38 for confirmation and determines if the received information is an interrupt event (512). As a result of the confirmation, the received data broadcast content may be provided by using hitherto reproduced video and voice broadcasts. In this case, the reception control section 34 determines the data broadcast content to be an interrupt event for the video and voice content and detects it (513).

When a user operates the digital broadcasting receiving apparatus 30, this event is assumed to be an interrupt event and is detected likewise. In this case, the interrupt event allows the time-shift storage and reproduction section 33 to record the content information. In addition, the user temporarily uses another broadcasting service or a function specific to the receiving apparatus 30. For example, the user displays a data broadcast program attached to the viewed program, or calls a setup menu for the receiving apparatus 30.

[Specify Time-Shift Operation (520)]

When an interrupt event is detected, the reception control section 24 acquires information about the reproduction start position of the stored information for the next reproduction in the storage medium from the time-shift storage and reproduction section 33. Since the reproduction is already in process, the reproduction start position in the medium corresponds to the recording position of the presently reproduced stored information. This position is equivalent to the recording position corresponding to the stored information at time ta in FIG. 9.

The acquired information is recorded as the reproduction start information in the reproduction start information recording section 37 (525). The reproduction start information can save one or a specified number of reproduction position information entities. When it is possible to record one reproduction position information entity, it is not overwritten if already recorded. When it is possible to record a plurality of reproduction position information entities, additional reproduction position information is recorded in an area where no information is recorded.

[Execute Interrupt Event (530)]

The reception control section 34 displays the data broadcast content as the interrupt event by generating OSD display information from the data broadcasting content information and supplying it to the display processing section 35 (531). However, neither video content nor voice content is displayed. When the user finishes viewing the data broadcast content and performs a termination operation on the user interface section 36, the reception control section 34 detects this operation (532).

Further, termination of the interrupt event is assumed when the pertinent data broadcasting content information or equivalent reception control information is removed from the information supplied to the demultiplexor 32.

Further, based on the interrupt event start and end times, the reception control section 34 computes and sets a valid period for the reproduction start information (533). In this example, the valid period is assumed to be td seconds after the interrupt event end time. When the interrupt event terminates, control returns to the interrupt detection.

[Control Time-Shift Reproduction (540)]

When no interrupt event is detected during the interrupt event determination (513), the reception control section 34 confirms whether the user requested the time, provided that the reproduction start information is valid (543). A user operation requests the time-shift reproduction via the user interface section 36.

When the time-shift reproduction is requested, the reception control section 34 reads reproduction start information from the reproduction start information recording section 37 (544). The reception control section 34 requests the time-shift storage and reproduction section 33 to start reproduction in accordance with the information about the recording position in the reproduction start information.

According to the reproduction start request from the reception control section 34, the time-shift storage and reproduction section 33 generates reproduction information from the stored information indicated by the specified recording position and supplies the generated information to the demultiplexor 32. Concurrently, the reception control section 34 separates the content information from the reproduction information, and then controls the demultiplexor 32 and display processing section 35 to generate a display signal from this content information. The time-shift reproduction then starts from the reproduction start position (545). In addition, the reproduction start information is erased (546).

In addition to effects of the first and second embodiments, the third embodiment always detects the interrupt event from the reception information. This can provide more favorable effects for the interrupt event requiring a prompt report such as a news flash.

Figure 10:
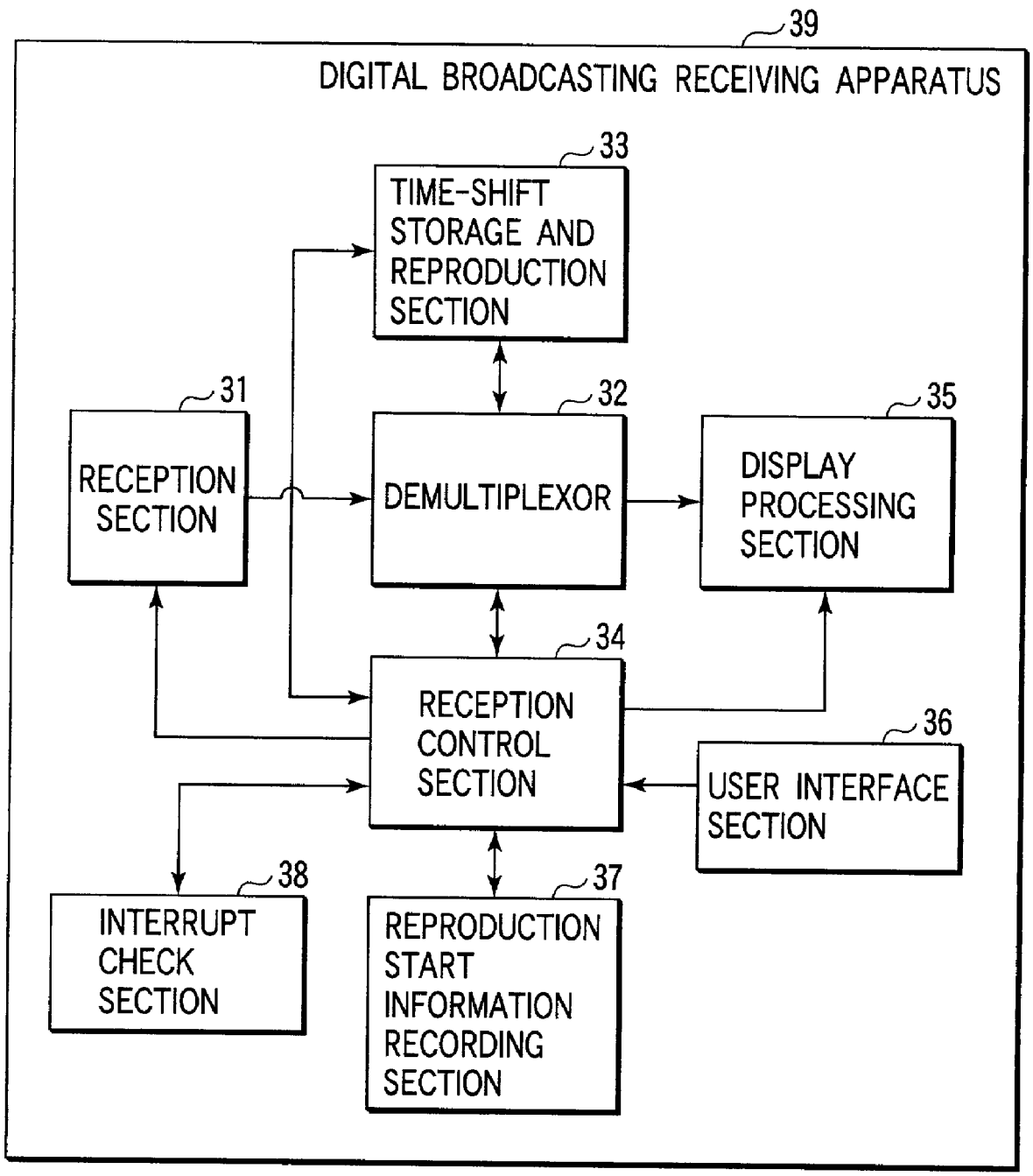
FIG. 10 is a block diagram illustrating a fourth embodiment of the present invention.

FIG. 10 diagrams a digital broadcasting receiving apparatus 39 according to the fourth embodiment of the present invention. The mutually corresponding parts in FIGS. 10 and 8 are designated by the same reference numerals. In the third embodiment, the time-shift storage and reproduction section 33 is directly supplied with a reception signal from the reception section 31. In the fourth embodiment, however, only information selected by the demultiplexor 32 is supplied to the time-shift storage and reproduction section 33. The time-shift storage and reproduction section 33 stores this information. The reception control section 34 controls the demultiplexor 32 so that the time-shift storage and reproduction section 33 is supplied with the content information and the corresponding reception control information according to a user-selected result.

In FIG. 10, the reception section 31 in the digital broadcasting receiving apparatus 30 selectively applies demodulation and error correction to a given carrier signal from the reception signal according to the method compliant to the transmission system and obtains reception information in the MPEG2-TS format. This reception information is supplied to the demultiplexor 32.

According to a user operation, the demultiplexor 32 selectively supplies the time-shift storage and reproduction section 33 with the selected content information and the reception control information associated with the content information.

The time-shift storage and reproduction section 33 stores the information selectively supplied from the demultiplexor 32 as stored information in a storage medium. During a time-shift operation, the time-shift storage and reproduction section 33 supplies the demultiplexor 32 with reproduction information reproduced from the stored information.

When no reproduction information occurs, the demultiplexor 32 separates and extracts the content information in the video and voice information from the supplied reception information and selectively supplies the extracted content information to the display processing section 35. When the reproduction information occurs, the demultiplexor 32 separates and extracts the content information in the video and voice information from the reproduction information and selectively supplies the extracted content information to the display processing section 35.

The reception control information associated with reproduction of the content information is separated from the information source such as the reception information and the reproduction information whichever is supplied to the display processing section 35.

Further, the demultiplexor 32 extracts the reception control information and the content information for determining an interrupt event from the reception information and supplies the extracted information to the reception control section 34. The display processing section 35 generates a display signal displayed on a display section according to either or both of the content information from the demultiplexor 32 and the OSD display information from the reception control section 34.

The reception control section 34 controls respective section operations so that the digital broadcasting receiving apparatus 39 can perform a sequence of reception operations. Further, the reception control section 34 can request the demultiplexor 32 to separate and extract the data broadcasting content information for reproducing and displaying data broadcasts. The reception control section 34 can acquire the separated data broadcasting content information, process it according to a method compliant to the data broadcasting system, and generate OSD display information. In addition, the reception control section 34 accepts a user operation via the user interface section 36 and processes it accordingly.

A user operation allows the user interface section 36 to perform a time-shift operation. When accepting an operation for interrupting the reproduction from the user, the reception control section 34 uses the reproduction start information recording section 37 to record a storage location of the presently reproduced stored information on the storage medium. When the user starts the reproduction, the reception control section 34 reproduces the reproduction information from the stored information corresponding to the record in the reproduction start information recording section 37.

The reception control section 34 provides the interrupt check section 38 with information about the interrupt event for determining an interrupt.

The reception control section 34 selects only the information to be displayed and the associated reception control information from the reception information and supplies the selected information to the time-shift storage and reproduction section 33. Reception control operations are same as those for the third embodiment.

The fourth embodiment just reproduces user-selected information after recording, but allows the time-shift storage and reproduction section 33 to record a smaller amount of the stored information than for the third embodiment.

Figure 11:
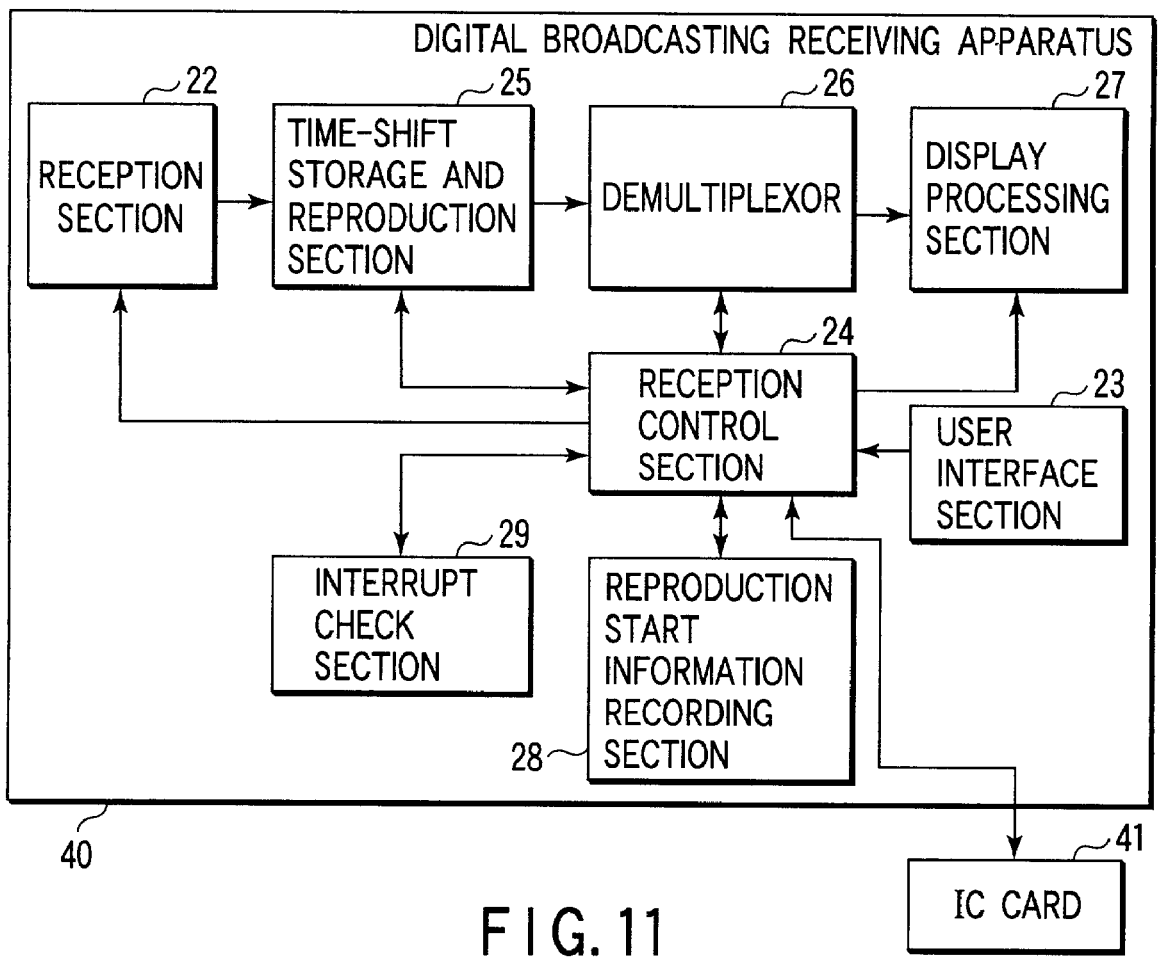
FIG. 11 is a block diagram showing the fifth and sixth embodiments of the present invention.
Figure 12:
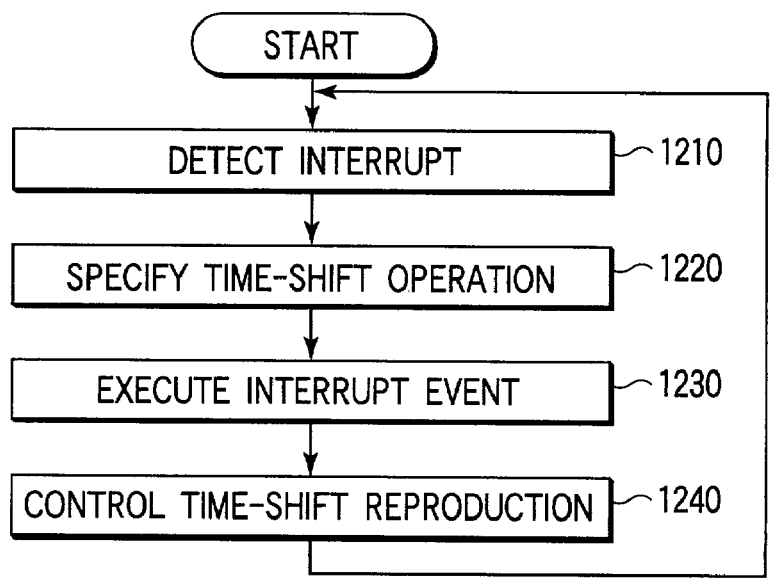
FIG. 12 is a flowchart showing an overall operation for the fifth embodiment of the present invention.
Figure 13A:
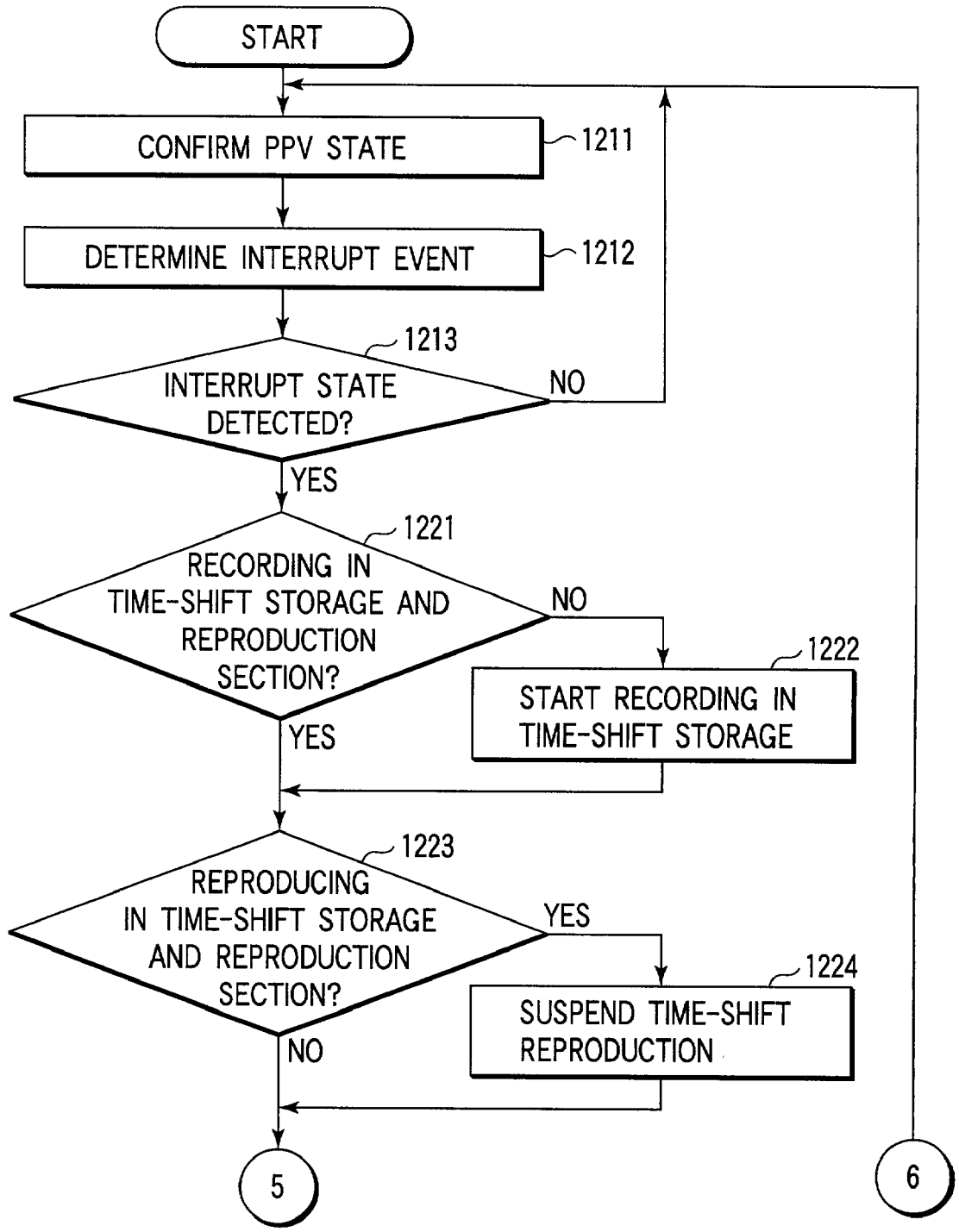
FIGS. 13A and 13B are flowcharts showing detailed operations for the fifth embodiment of the present invention.
Figure 13B:
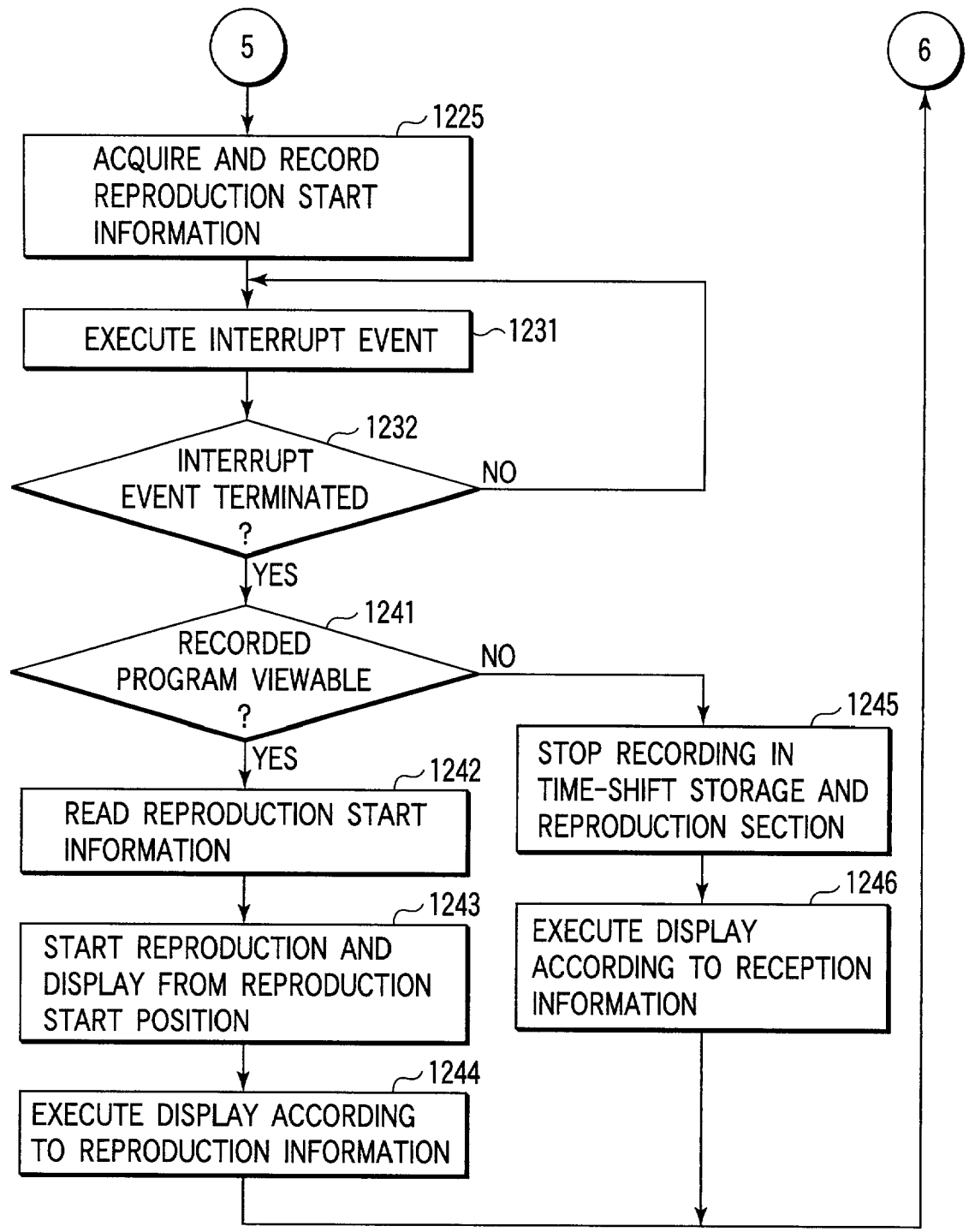
Figure 14:
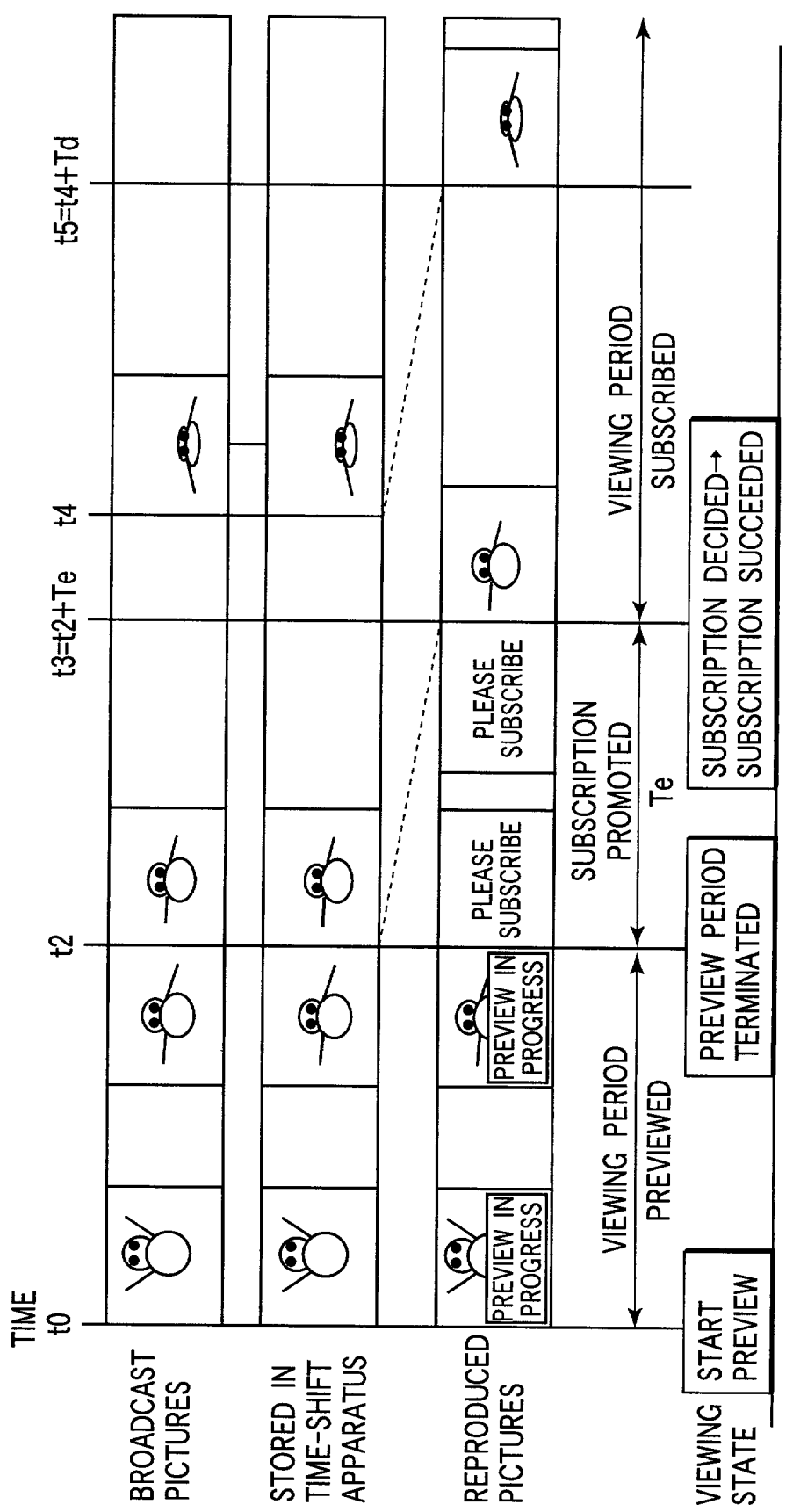
FIG. 14 illustrates detailed operations for the fifth embodiment of the present invention on displayed pictures.

FIG. 11 diagrams a digital broadcasting receiving apparatus 40 according to the fifth embodiment of the present invention. The mutually corresponding parts in FIGS. 11 and 1 are designated by the same reference numerals. The reception control section 24 comprises an IC (Integrated Circuit) card 41 as a conditional access management unit for managing the above-mentioned conditional access and a connection interface for connection therewith. The demultiplexor 26 comprises a descramble function for conditional access decryption.

When the PMT for conditional access broadcasting is received and is supplied to the reception control section 24 via the demultiplexor 26, the PMT contains information about the conditional access, enabling detection of the conditional access. According to the PMT content, the reception control section 24 controls the demultiplexor 26 to fetch an ECM.

The reception control section 24 uses the ECM fetched by the demultiplexor 26 to generate a command for confirming a viewing restriction state and transfers the command to the IC card 41. The IC card 41 stores information about viewing restrictions according to a specified method. This information is compared with the command information. A response including a result of determining the viewing restriction is returned to the reception control section 24.

Based on the response, the reception control section 24 controls each section of the receiving apparatus 40. When a viewable state is returned, the response from the IC card 41 contains descramble information for resetting the scramble. Using this information, the reception control section 24 controls the demultiplexor 26 to descramble the stream.

When an unviewable state is returned, the reception control section 24 provides the display processing section 27 with display information for indicating the unviewable state. When the ECM contained in the command is associated with a PPV program, the response from the IC card 41 also includes information indicating whether the program can be previewed.

The time-shift storage and reproduction section 25 receives the reproduction information from the reception section 22. During time-shift recording, the time-shift storage and reproduction section 25 records the current reception information as stored information for maintaining the stored information long enough for providing the time-shift capability. During the time-shift reproduction, the time-shift storage and reproduction section 25 reproduces the reproduction information from the stored information and supplies it to the demultiplexor 26. The time-shift storage and reproduction section 25 supplies the reception information to the demultiplexor 26 except during the time-shift reproduction, and supplies the reproduction information to the demultiplexor 26 during the time-shift reproduction.

Operations of the fifth embodiment are described below with reference to FIGS. 12, 13A, 13B, and 14. When a command response from the IC card 41 causes detection of the PPV preview state for the currently received or reproduced program, a preview operation starts along with a preview display.

When the user starts a subscription operation during the preview, the reception control section 24 uses the interrupt check section 29 to determine the subscription operation to be an interrupt event (1212). When the time-shift storage and reproduction section 25 performs no recording (1221), time-shift stored recording starts (1222). When the time-shift storage and reproduction section 25 performs reproduction (1223), the time-shift reproduction is suspended (1224). The reception control section 24 acquires a stored information reproduction location in the time-shift storage and reproduction section 25 and records this location as the reproduction start information in the reproduction start information recording section 28 (1225).

Concurrently, the reception control section 24 performs an interrupt event (1231). Namely, the reception control section 24 requests the display processing section 27 to turn off the video information display. Further, the reception control section 24 provides the display processing section 27 with the OSD display information on a subscription processing screen according to a specified subscription procedure. Based on a request from the reception control section 24, the display processing section 27 turns off the video information and displays the subscription screen.

When the user registers and confirms subscription conditions according to the subscription procedure and agrees with the subscription execution, the reception control section 24 issues a subscription request containing the ECM to the IC card 41. Upon receipt of a response indicating a successful subscription from the IC card 41, the reception control section 24 terminates the interrupt event (1232).

When executing the PPV subscription terminates the interrupt event, the reception control section 24 provides control to start reproduction from a location recorded as the reproduction start information (1241 to 1243). Further, the reception control section 24 controls the display processing section 27 to perform reproduction based on the reproduction information (1244). Under this control, time-shift storage and reproduction section 25 starts reproducing the stored information.

When the preview period expires (time t2 in FIG. 14), the digital broadcasting receiving apparatus 40 prompts a user for subscription. The reception control section 24 uses the interrupt check section 29 to determine the subscription promotion to be an interrupt event (1212 and 1213). When the time-shift storage and reproduction section 25 performs no recording (1221), time-shift stored recording starts (1222). When the time-shift storage and reproduction section 25 performs reproduction (1223), the time-shift reproduction is suspended (1224). The reception control section 24 acquires a stored information reproduction location in the time-shift storage and reproduction section 25 and records this location as the reproduction start information in the reproduction start information recording section 28 (1225).

Furthermore, the reception control section 24 provides control to stop presenting the content information of video and voice. The reception control section 24 supplies the display processing section 27 with the OSD display information on the subscription processing screen according to a specified subscription procedure. Under control of the reception control section 24, the display processing section 27 turns off the video information and displays the subscription screen.

When the user registers and confirms subscription conditions according to the subscription procedure and agrees with the subscription execution, the reception control section 24 issues a subscription request containing the ECM to the IC card 41. Upon receipt of a response indicating a successful subscription from the IC card 41 (time t3 in FIG. 14), the interrupt check section 29 determines termination of the interrupt event (1232).

Upon receipt of the interrupt event termination and the successful subscription, the reception control section 24 reads the reproduction start information from the reproduction start information recording section 28 (1242). The reception control section 24 requests the time-shift storage and reproduction section 25 to start reproduction from a location recorded as the reproduction start information (1243). The reception control section 24 controls the display processing section 27 to execute the display according to the content information (1244). Based on the request, the time-shift storage and reproduction section 25 starts reproducing the stored information.

When the interrupt event terminates without subscription, the reception control section 24 allows the time-shift storage and reproduction section 25 to stop recording the stored information (1245). Under control of the reception control section 24, the display processing section 27 provides a display based on the reception information, and the demultiplexor 26 extracts the content information from the reception information (1246).

For example, the interrupt event may terminate without subscription in the following cases. Namely, a user may select another program. The reception control information may be used for detecting the end of a program. Alternatively, a response from the conditional access management unit may cause a detection of an unsuccessful subscription to the program.

The above-mentioned fifth embodiment enables to view a PPV program which does not provide a display interrupting the program content during an operation for the subscription. If the preview period expires before the subscription, the user can view the program until the actual subscription starts.

According to the fifth embodiment, the digital broadcasting receiving apparatus 40 contains the reception section 22, the reception control section 24, the time-shift storage and reproduction section 25, the demultiplexor 26, the display processing section 27, and the reproduction start information recording section 28. It may be preferable to provide these as separate modules.

The fifth embodiment explains a reproduction position of the currently stored information as information recorded in the reproduction start information recording section 28. The other various formats are available. For example, when the stored information also contains information about the program's broadcasting time, the reproduction start information can be time information based on that information, say, a stored information recording position corresponding to the program start time.

In the fifth embodiment, the reproduction start position is just taken from a position stored in the reproduction start information recorded in the reproduction start information recording section 28. The reproduction start position can be a position found at the reproduction startup with reference to the reproduction start information. For example, it may be preferable to retrieve the program start time including the position indicated by the reproduction start information and use the stored information corresponding to the start time as the reproduction start position. Alternatively, the reproduction start position can be a specified period, say, 10 seconds before the reproduction start information.

It is also possible to constitute each section as part of the independent apparatus and implement the function by combining each apparatus. For example, it is possible to configure the reception section 22, the time-shift storage and reproduction section 25, and the reproduction start information recording section 28 as an independent external apparatus. If such an apparatus functions as the time-shift storage and reproduction section 25, it can have a time-shift control section for providing independent control.

The apparatus with this configuration may be connected to a receiving apparatus which is equipped with the other sections. In this case, the control section provides operations similar to those of the fifth embodiment by managing cooperation between the reception control section 24 and the time-shift storage and reproduction section 25.

In the fifth embodiment, restarting the reproduction follows a blackout after the subscription starts or the preview terminates. Moreover, there can be a great variety of examples. For example, it is possible to estimate the program start time according to the EIT (Event Information Table) at the time of the subscription and start the reproduction by retrieving a location corresponding to this program start time.

The following are contemplated as falling within the scope of the present invention. Related information is recorded at the time with reference to a recording position corresponding to the timing for occurrence of an interrupt event such as a subscription start or preview termination. After the interrupt event terminates, the reproduction restarts according to the recorded information.

In the first to fifth embodiments as mentioned above, each section constituting the present invention may implement part or all of its functions through software by using an appropriate interface with the RAM (Random Access Memory), the ROM (Read Only Memory), and the MPU (Micro Processing Unit).

In this case, respective functions are often integrally implemented in the software managed by the same processor. This is contemplated as falling within the scope of the present invention if the pertinent software or hardware implements the function of means proposed in the present invention.

The following describes the sixth embodiment of the present invention. This embodiment has the same configuration as that of the fifth embodiment as shown in FIG. 11. In the sixth embodiment, it is assumed that the interrupt check section 29 detects an interrupt event when a selected program is under control of viewing management and is unviewable.

The reception control section 24 receives an interrupt event detection. When the time-shift storage and reproduction section 25 is not recording stored information, the reception control section 24 starts recording. When the time-shift storage and reproduction section 25 is performing reproduction, the reception control section 24 suspends the reproduction.

From the time-shift storage and reproduction section 25, the reception control section 24 obtains a position corresponding to the stored information at the storage startup or the most recent reproduction position, and records this information as the reproduction start information. The reception control section 24 supplies the data to the display processing section 27 and controls it to indicate the conditional access management state as the interrupt event.

In response to this state, a user may replace the conditional access management unit with an IC card containing another contract information, or connect an additional card. Further, a change in the contract condition may be detected. In these cases, the reception control section 24 requests the new conditional access management unit to confirm a viewing state including an ECM for the currently stored program and receives a corresponding response. When detecting that the program has become viewable according to the received response, the reception control section 24 use the interrupt check section 29 to determine termination of the interrupt event.

When the interrupt event terminates, if the stored program is viewable, the reception control section 24 reads the reproduction start information. The reception control section 24 requests the time-shift storage and reproduction section 25 to reproduce reproduction information from the corresponding stored information. Further, the reception control section 24 controls the demultiplexor 26 and the display processing section 27 to perform a viewing operation based on the reproduction information. The display processing section 27 performs a display based on the request.

The first time the program reception starts, an unviewable program may be selected according to the management of a conditional access management unit connected at that time. In such a case, the sixth embodiment provides a full service for the program just after the selection in the form of time-shift viewing by later connecting an appropriate conditional access management unit.

FIG. 15 shows a seventh embodiment of the present invention. The seventh embodiment comprises two apparatuses: a digital broadcast receiving apparatus 42 and a time-shift storage apparatus 43. The digital broadcast receiving apparatus 42 and the time-shift storage apparatus 43 are provided with a reception control section 44 and a time-shift storage control section 45, respectively. The reception control section 44 and the time-shift storage control section 45 work cooperatively to implement same operations as those of the reception control section 34 in the digital broadcasting receiving apparatus 30 according to the third embodiment.

When an interrupt event is detected, the demultiplexor 46 may separate and extract the current content information from the reproduction information. In such a case, the reception control section 44 requests the time-shift storage control section 45 to record the reproduction start information. According to the request, the time-shift storage control section 45 obtains storage location information in the stored information corresponding to the reproduction information from the time-shift storage and reproduction section 47. The obtained information is stored as the reproduction start information in the reproduction start information recording section 48.

When detecting termination of the interrupt event, the reception control section 44 requests the time-shift storage control section 45 to restart reproduction. Based on the request, the time-shift storage control section 45 starts reproduction by reading information from the reproduction start information recording section 48.

Each apparatus exemplified in this seventh embodiment can provide functions of the digital broadcasting receiving apparatus in combination with a display apparatus and the like. However, these apparatuses in the seventh embodiment can provide the same effect as the present invention in combination with an apparatus which cooperatively implements the functions of the present invention.

The seventh embodiment just exemplifies the division of the apparatus functionalities and the method thereof. It may possible to divide the apparatus functionalities furthermore. However, the following are contemplated as falling within the scope of the present invention. Namely, the interconnected devices cooperatively work to detect an interrupt event and record information about a reproduction restart in the reproduction start information recording section 48. After termination of the interrupt event, these devices follow the reproduction start information and provide control to supply reproduction information based on the stored information recorded in the time-shift storage and reproduction section 47.

Finally, the following provides a supplementary explanation of the above-mentioned terms. A broadcasting signal is used for transmitting broadcasting information and is multiplexed, modulated, and added error-correcting code in a broadcasting station. For example, broadcasting information in the MPEG2-TS format is added error-correcting code with the Reed-Solomon coding and the trellis coding. Further, this broadcasting information is provided with modulations such as OFDM (Orthogonal Frequency Division Multiplex), PSK (Phase Shift Keying), QAM (Quadrature Amplitude Modulation), and 8VSB (Vestigial Sideband).

Broadcasting information is used for a broadcasting station to provide broadcasting programs as scheduled. For example, the broadcasting information includes ISO/IEC13818-2 compliant MPEG2 video data for pictures, ISO/IEC13818-3 compliant MPEG2 audio and ISO/IEC13818-7 compliant MPEG2 AAC for voice data, the data carrousel defined in ARIB-STD-B24 for other transmission data, and the like. These different types of data are synthesized through the use of the MPEG2-TS format which is defined in ISO/IEC13818-1 and is extended in ARIB-STD-B10, ARIB-STD-B25, and the like.

Reception information is a broadcasting signal which is received in the broadcast receiving apparatus's reception section via a transmission network and is demodulated and error-corrected there.

Reproduction information is reproduced from the past stored information stored in the time-shift storage and reproduction section and is capable of reproducing the past content.

Reception control information belongs to the reception information and is used for controlling a broadcast receiving apparatus's reception state. As MPEG2-TS examples, the reception control information includes PSI and SI.

A content is substantial of a video, voice, or data broadcast service constituting a broadcasting program.

Content information belongs to the reception information and constitutes a content.

Stored information belongs to the past reception information and contains necessary information at least for reproducing a content. The stored information is recorded in the time-shift storage and reproduction section.

A normal screen is used for a picture which is reproduced according to a specified, normal standard. For example, an MPEG2-TS normal screen basically comprises an MPEG2 video arranged in the PMT.

Display includes representations to users through the use of all possible means such as picture depictions on a screen, voice expressions, and the like.

A time-shift operation records information needed for content reproduction and displays a content from the already recorded information.

An OSD display generates display data on both a display plane, say, a normal screen for ordinary pictures and another display plane (OSD display plane), and displays both data by overlapping. The overlapping methods include superimposition, overlay, and a blending.

An OSD screen comprises display data provided on the OSD plane.

Display processing in the display processing section is needed for generating a display signal for display.

A PPV program becomes viewable when a user subscribes and pays charges on a charging basis such as a program, a content, one or any combination of picture or voice units.

A conditional access provides broadcasting programs for only specific users such as subscription contractors of charged broadcasts or program subscribers.

A charged broadcast provides programs only for a subscription contractor, namely a user who paid charges.

A preview is a PPV program function for allowing part of the program to be viewed free of charge under specific conditions before legal subscription to the program and an action of viewing programs by using that function. The conditional access management unit manages and determines conditions, say, by comparing the viewing restriction information with the internal contract information.

A blackout erases a content screen or voice except the OSD screen.

An interrupt event is an externally influencing factor in general which is applied to a content's viewing form expected by a user and results from an unexpected situation for program provision or program's contractual conditions. Particularly, the present invention is applicable to the following interrupt event examples such as a change in the information provision or the program viewing state due to data broadcasting content information from the broadcasting side and a change in the PPV viewing state, say, starting a preview, starting the subscription, terminating the preview, and the like. Further, the present invention is applicable to user operations not affecting the program reception continuity such as selecting an additional data broadcast content, operating a menu, configuring or adjusting various receiving apparatus settings.

Viewability information indicates whether a selected charged content is viewable or unviewable.

Unviewable is attributed to a state which disables representation of picture or voice data.

Viewable is attributed to a state which enables representation of picture or voice data.

Data broadcasting content information belongs to the content information and constitutes a data broadcast.

A data broadcast comprises a normal broadcast format and another specified format. The normal broadcast format is used for providing normal television-format services comprising pictures and voices.

A user interface accepts user's operations such as manipulating a button, a remote commander, and the like.

Reproduction start information includes information which can specify a storage location of the stored information for allowing the time-shift storage and reproduction section to start reproduction.

Interrupt display information is supplied to the display processing section for providing a display according to an interrupt event.

As detailed above, the present invention can promptly represent an interrupt event and a content independently of the interrupt event. It is possible to provide users with services without degrading the quality of representing program contents.

Further, the present invention uses the time-shift function to display a screen being previewed or a program before the subscription, providing a PPV program without annoying users.

Moreover, even if a preview period expires before the subscription, the present invention can provide a program during the blackout without losing its content by reproducing that program through the use of the time-shift function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital broadcasting receiving apparatus for selecting a predetermined program based on a received digital broadcasting signal, and displaying the predetermined program, comprising:
    a display control section for displaying an interrupt event in response to an occurrence of the interrupt event during display of a program selected based on the received digital broadcasting signal;
    a detection section for detecting the occurrence of the interrupt event;
    a storage section for initiating a process of storing a program being displayed, in response to a detection of the occurrence of the interrupt event, by the detection section;
    a recording section for recording information corresponding to a reproduction start position of the program stored in the storage section; and
    a control section for reading a program from the storage section and displaying the program when the interrupt event has terminated, on the basis of information corresponding to a reproduction start position recorded at the recording section.

2. A digital broadcasting receiving apparatus according to claim 1, further comprising a separation section for separating the interrupt event from the program and displaying the interrupt event in response to a detection of the occurrence of the interrupt event, by the detection section.

3. A digital broadcasting receiving apparatus for selecting a predetermined program based on a received digital broadcasting signal, and displaying the predetermined program, comprising:
    a display control section for displaying an interrupt event in response to an occurrence of the interrupt event during display of a program selected based on the received digital broadcasting signal;
    a detection section for detecting the occurrence of the interrupt event;
    a storage section for initiating a process of storing a program being displayed, in response to a detection of an occurrence of the interrupt event, by the detection section; and
    a recording section for recording information corresponding to a reproduction start position of the program stored in the storage section,
    wherein when a user selects a program different from the program being displayed, the recording section nullifies information corresponding to the reproduction start position of the program stored in the storage section.

4. A digital broadcasting receiving apparatus for selecting a predetermined program based on a received digital broadcasting signal, and displaying the predetermined program, comprising:
    a display control section for displaying an interrupt event in response to an occurrence of the interrupt event during display of a program selected based on the received digital broadcasting signal;
    a detection section for detecting the occurrence of the interrupt event;
    a storage section for initiating a process of storing a program being displayed, in response to a detection of the occurrence of the interrupt event; and a recording section for recording information corresponding to a reproduction start position of the program stored in the storage section, wherein when the program stored in the storage section is erased, the recording section nullifies information corresponding to the reproduction start position of the program.

5. A method of controlling a digital broadcasting receiving apparatus for selecting a predetermined program based on a received digital broadcasting signal, and displaying the predetermined program, comprising:

displaying an interrupt event in response to an occurrence of the interrupt event during display of a program selected based on the received digital broadcasting signal;

detecting the occurrence of the interrupt event;

initiating a process of storing a program being displayed, when the occurrence of the interrupt event is detected;

recording information corresponding to a reproduction start position of a stored program; and reading the stored program based on recorded information corresponding to a reproduction start position,when the interrupt event has terminates, and displaying the stored program.

6. A method of controlling a digital broadcasting receiving apparatus for selecting a predetermined program based on a received digital broadcasting signal, and displaying the predetermined program, according to claim 5, further comprising separating the interrupt event from the program being displayed, when the occurrence of interrupt event is detected, and displaying in the interrupt event.

7. A method of controlling a digital broadcasting receiving apparatus for selecting a predetermined program based on a received digital braodcasting signal, and displaying the predetermined program, comprising:

displaying an interrupt event in response to an occurrence of the interrupt event during display of a program selected based on the received digital broadcasting signal;

detecting the occurrence of the interrupt event;

initiating a process of storing a program being displayed, when the occurrence of the interrupt event is detected; and recording information corresponding to a reproduction start position of a stored program, wherein when a user selects a program different from the program being displayed, said recording includes nullifying information corresponding to the reproduction start position of the program stored in the storage section.

8. A method of controlling a digital broadcasting receiving apparatus for selecting a predetermined program based on a received digital broadcasting signal, and displaying the predetermined program comprising:

displaying an interrupt event in response to an occurrence of the interrupt event during display of a program selected based on the received digital broadcasting signal;

detecting the occurrence of the interrupt event;

initiating a process of storing program being displayed, when the occurrence of the interrupt event is detected; and recording information corresponding to a reproduction start position of a stored program, wherein when the program stored in the storage section is erased, recording of information corresponding to the reproduction start position of the program includes nullifying the information corresponding to the reproduction start position of the program.

* * * * *